(12) United States Patent
Noel et al.

(10) Patent No.: US 11,844,025 B2
(45) Date of Patent: *Dec. 12, 2023

(54) UPLINK POWER CONTROL USING POWER SPECTRAL DENSITY TO AVOID ADJACENT SATELLITE INTERFERENCE

(71) Applicant: Kymeta Corporation, Redmond, WA (US)

(72) Inventors: Turner Noel, Kirkland, WA (US); Mark Opfell, Kirkland, WA (US); Eric Bjorn Hultman, Redmond, WA (US); Steven Michael Ziuchkovski, Redmond, WA (US); Lekshmi Priya Ravindran Subhadramma, Redmond, WA (US); Daeup Chang, Redmond, WA (US); Steven Charles Borchers, Redmond, WA (US); Ron Radko, Kirkland, WA (US)

(73) Assignee: KYMETA CORPORATION, Redmond, WA (US)

( * ) Notice: Subject to any disclaimer, the term of this patent is extended or adjusted under 35 U.S.C. 154(b) by 55 days.

This patent is subject to a terminal disclaimer.

(21) Appl. No.: 17/530,289

(22) Filed: Nov. 18, 2021

(65) Prior Publication Data

US 2022/0256471 A1    Aug. 11, 2022

Related U.S. Application Data

(63) Continuation of application No. 16/721,531, filed on Dec. 19, 2019, now Pat. No. 11,284,354.
(Continued)

(51) Int. Cl.
*H04W 52/14* (2009.01)
*H04W 52/16* (2009.01)
(Continued)

(52) U.S. Cl.
CPC ......... *H04W 52/146* (2013.01); *H04W 52/16* (2013.01); *H04W 52/242* (2013.01); *H04W 52/38* (2013.01)

(58) Field of Classification Search
CPC . H04W 52/146; H04W 52/16; H04W 52/242; H04W 52/38; H04W 52/367;
(Continued)

(56) References Cited

U.S. PATENT DOCUMENTS

| 6,813,476 B1 * | 11/2004 | Brooker ............. H04B 7/18513 |
| | | 455/430 |
| 2002/0058478 A1 | 5/2002 | De La Chapelle et al. |

(Continued)

FOREIGN PATENT DOCUMENTS

WO    2018194726 A1    10/2018

OTHER PUBLICATIONS

International Search report for Application No. PCT/US2019/068635 dated Apr. 28, 2020, 5 pages.
(Continued)

*Primary Examiner* — Ankur Jain
(74) *Attorney, Agent, or Firm* — Womble Bond Dickinson (US) LLP

(57) ABSTRACT

A method and apparatus for uplink power control based on power spectral density are disclosed. In one embodiment, the method for use by a terminal in a satellite communication system, the terminal having an antenna, a modem and a controller, the method comprising: determining the scan and skew of the antenna; obtaining, using the controller, a value representing a maximum allowed Power Spectral Density (PSD) for the determined scan and skew; determining, using the controller, a maximum allowable modem power based on the value representing a maximum allowed PSD, where the maximum allowable modem power is that
(Continued)

which ensures that transmissions from the terminal do not exceed the maximum allowed PSD if the maximum allowable modem output power is not exceeded by the modem; sending, using the controller, an indication of the allowable modem output power to the modem; and performing one or more transmissions from the terminal based on modem outputs in accordance with the maximum allowable modem output power.

20 Claims, 25 Drawing Sheets

Related U.S. Application Data

(60) Provisional application No. 62/924,519, filed on Oct. 22, 2019, provisional application No. 62/786,795, filed on Dec. 31, 2018.

(51) Int. Cl.
  *H04W 52/24* (2009.01)
  *H04W 52/38* (2009.01)

(58) Field of Classification Search
  CPC .. H04B 7/18517; H04B 7/18519; H04B 7/19; H04B 17/102
  See application file for complete search history.

(56) References Cited

U.S. PATENT DOCUMENTS

| | | | |
|---|---|---|---|
| 2004/0082295 A1 | 4/2004 | Ngai et al. | |
| 2011/0207425 A1* | 8/2011 | Juntunen | H03D 7/125 455/293 |
| 2013/0243054 A1* | 9/2013 | Adada | H04B 17/102 375/222 |
| 2017/0188317 A1* | 6/2017 | Salamat | H04B 7/18508 |
| 2018/0006371 A1* | 1/2018 | Dang | H04W 16/28 |

OTHER PUBLICATIONS

International Preliminary Report and Written Opinion on the Patentability of Application No. PCT/US2019/068635 dated Jul. 15, 2021 8 pages.

* cited by examiner

| Scan (deg) \ Skew (deg) | 0 | 5 | 10 | 15 | 20 | 25 | 30 | 35 | 40 | 45 | 50 | 55 | 60 | 65 | 70 | 75 | 80 | 85 | 90 |
|---|---|---|---|---|---|---|---|---|---|---|---|---|---|---|---|---|---|---|---|
| 0 | 15.7 | 14.7 | 14.0 | 13.5 | 13.5 | 14.0 | 14.3 | 14.1 | 13.3 | 13.8 | 14.9 | 15.1 | 15.2 | 15.0 | 14.9 | 15.3 | 15.1 | 14.5 | 14.3 |
| 5 | 15.8 | 15.8 | 15.6 | 15.0 | 14.1 | 13.9 | 14.5 | 14.8 | 14.6 | 14.9 | 14.4 | 14.1 | 14.8 | 14.9 | 14.9 | 14.9 | 14.8 | 14.2 | 13.5 |
| 10 | 16.3 | 16.3 | 16.3 | 15.2 | 14.0 | 13.8 | 14.3 | 14.4 | 15.2 | 15.2 | 14.7 | 14.4 | 14.3 | 14.6 | 14.9 | 14.8 | 15.0 | 14.8 | 14.9 |
| 15 | 16.2 | 16.2 | 15.0 | 14.6 | 14.2 | 14.2 | 14.3 | 15.0 | 15.1 | 15.1 | 14.8 | 14.5 | 14.7 | 14.6 | 14.7 | 14.7 | 14.7 | 14.6 | 14.5 |
| 20 | 16.2 | 16.1 | 14.9 | 13.8 | 13.5 | 13.1 | 13.4 | 13.9 | 14.6 | 15.2 | 15.2 | 14.9 | 14.4 | 14.2 | 14.2 | 14.1 | 13.9 | 14.1 | 14.1 |
| 25 | 16.2 | 16.2 | 15.4 | 14.4 | 13.6 | 13.3 | 13.5 | 14.0 | 14.7 | 14.8 | 14.4 | 14.0 | 13.4 | 12.7 | 12.7 | 13.0 | 13.1 | 13.3 | 13.5 |
| 30 | 15.5 | 15.1 | 15.0 | 14.3 | 13.6 | 13.3 | 13.5 | 13.3 | 14.1 | 14.7 | 14.7 | 13.8 | 13.3 | 12.8 | 12.6 | 12.6 | 12.6 | 12.7 | 12.7 |
| 35 | 16.0 | 16.0 | 15.0 | 13.7 | 12.3 | 12.4 | 12.2 | 12.1 | 12.9 | 14.4 | 14.0 | 13.0 | 12.1 | 11.9 | 12.1 | 11.5 | 11.5 | 11.9 | 12.0 |
| 40 | 16.6 | 16.5 | 15.6 | 14.4 | 13.2 | 12.4 | 11.9 | 12.0 | 12.8 | 13.5 | 14.0 | 12.8 | 11.6 | 10.8 | 10.8 | 10.7 | 10.6 | 11.4 | 12.0 |
| 45 | 15.8 | 16.3 | 16.6 | 15.3 | 14.0 | 13.1 | 12.7 | 13.0 | 13.0 | 13.4 | 13.5 | 12.9 | 11.2 | 10.0 | 9.6 | 9.8 | 10.5 | 11.2 | 11.3 |
| 50 | 16.0 | 16.0 | 15.8 | 15.5 | 15.2 | 14.2 | 13.7 | 13.4 | 13.2 | 13.0 | 12.7 | 12.5 | 11.3 | 9.5 | 8.3 | 8.2 | 8.3 | 9.8 | 10.2 |
| 55 | 15.8 | 15.1 | 14.4 | 13.7 | 12.8 | 12.2 | 11.6 | 11.3 | 11.2 | 11.3 | 12.1 | 11.8 | 10.5 | 8.2 | 7.2 | 7.3 | 7.7 | 8.5 | 8.7 |
| 60 | 12.2 | 12.1 | 11.9 | 11.7 | 11.6 | 11.1 | 10.0 | 9.1 | 8.9 | 9.4 | 10.2 | 10.7 | 10.1 | 7.9 | 5.9 | 5.7 | 5.5 | 6.7 | 7.0 |
| 65 | 14.1 | 14.3 | 14.2 | 13.6 | 12.7 | 11.6 | 10.6 | 9.4 | 8.4 | 7.7 | 7.5 | 7.5 | 8.3 | 8.1 | 5.6 | 4.3 | 4.4 | 5.6 | 6.1 |
| 70 | 15.5 | 15.0 | 14.5 | 13.5 | 12.4 | 11.4 | 10.0 | 8.7 | 7.5 | 6.5 | 5.6 | 5.2 | 5.7 | 7.2 | 6.7 | 4.7 | 3.9 | 3.9 | 4.9 |
| 75 | 14.6 | 14.9 | 14.6 | 13.4 | 12.4 | 10.9 | 9.5 | 8.2 | 6.8 | 5.6 | 4.5 | 4.1 | 4.7 | 6.2 | 4.8 | 3.2 | 2.6 | 3.2 | 3.1 |

FIG. 35

UPLINK POWER CONTROL USING POWER SPECTRAL DENSITY TO AVOID ADJACENT SATELLITE INTERFERENCE

PRIORITY

The present patent application is a continuation of and claims benefit of U.S. patent application Ser. No. 16/721,531, filed on Dec. 19, 2019 and entitled "Uplink Power Control Using Power Spectral Density to Avoid Adjacent Satellite Interference," which claims priority to and incorporates by reference corresponding provisional patent application No. 62/786,795, titled "Method for Determining Maximum Power Spectral Density to Avoid Adjacent Satellite Interference," filed on Dec. 31, 2018; and provisional patent application no. 62/924,519, titled "Method for Determining Maximum Power Spectral Density to Avoid Adjacent Satellite Interference," filed Oct. 22, 2019.

FIELD OF THE INVENTION

Embodiments of the present invention relate to wireless communication; more particularly, embodiments of the present invention relate to uplink power control for satellite antennas that is based on power spectral density.

BACKGROUND

In the world of GEO satellite communications, the equatorial plane some 36,000 km away from the surface of the earth is typically populated every 2 degrees in longitude with a satellite. The satellite industry shares the frequency spectrum. This places a burden on the satellite communications user segment (antennas) to produce pencil-beam emissions. These pencil beams focus as much of its energy as possible on its target satellite, while protecting neighboring satellites from unwanted and/or harmful interference through spatial isolation.

It would be difficult to design an antenna that radiates zero energy towards neighboring satellites. This is widely recognized in the satellite industry, and some energy is expected to radiate towards unwanted satellite(s). However, it is critical to control the energy levels in these instances below acceptable thresholds. Satellite operators in coordination with ITU, FCC and other regulatory bodies have produced rules for maximum permissible power levels as a function of off-axis angles (away from target satellite). These rules are known as Power Spectral Density (PSD) masks, and they slightly vary depending on geographical region and satellite orbit slot nature. As such, most commonly enforced PSD masks are:

FCC PSD Mask
ITU PSD Mask
Coordinated PSD Mask

To stay compliant with regulatory PSD masks, an antenna/terminal operator has two choices: expand bandwidth of the channel in use when non-compliance is detected or lower the power output of the terminal when non-compliance is detected. In certain commercial satellite communication network configurations, bandwidth of the transmit (Tx) channels is fixed and cannot be changed dynamically, leaving power back-off as the only option.

SUMMARY OF THE INVENTION

A method and apparatus for uplink power control based on power spectral density are disclosed. In one embodiment, the method for use by a terminal in a satellite communication system, the terminal having an antenna, a modem and a controller, the method comprising: determining the scan and skew of the antenna; obtaining, using the controller, a value representing a maximum allowed Power Spectral Density (PSD) for the determined scan and skew; determining, using the controller, a maximum allowable modem power based on the value representing a maximum allowed PSD, where the maximum allowable modem power is that which ensures that transmissions from the terminal do not exceed the maximum allowed PSD if the maximum allowable modem output power is not exceeded by the modem; sending, using the controller, an indication of the allowable modem output power to the modem; and performing one or more transmissions from the terminal based on modem outputs in accordance with the maximum allowable modem output power.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 35 illustrates an example of a table for obtaining the maximum PSD based on theta and skew values.

DETAILED DESCRIPTION

Figure 1:
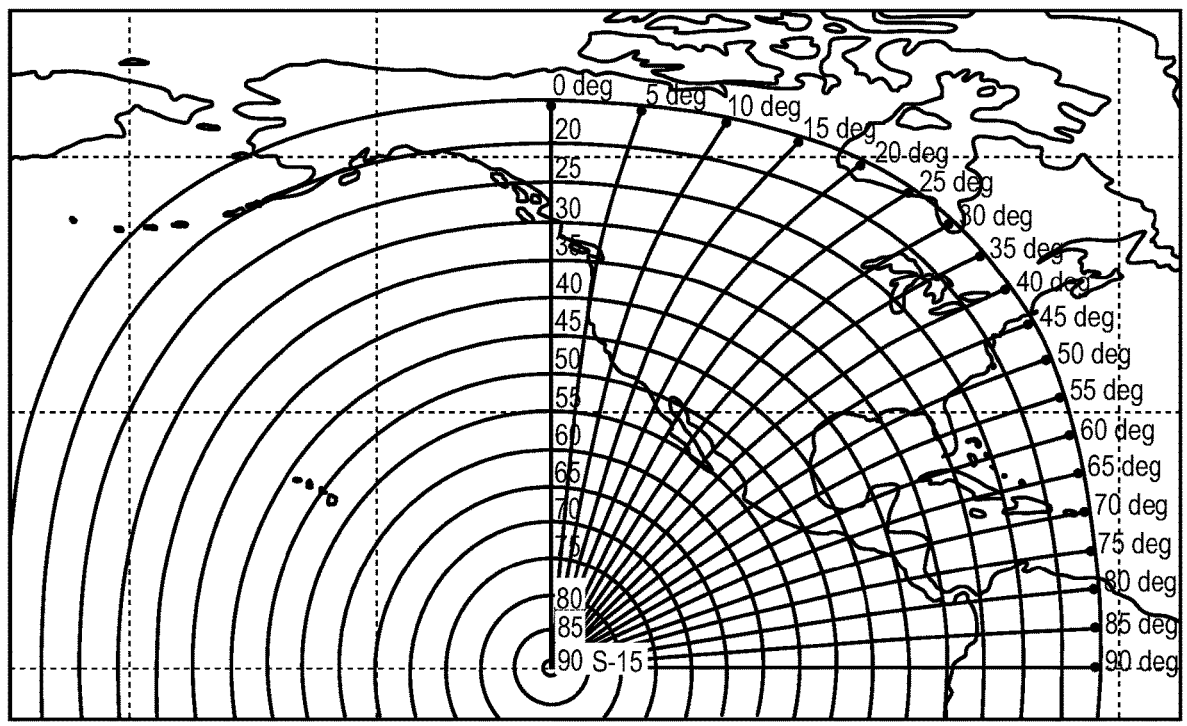
FIG. 1 illustrates concepts of both scan and skew assuming a horizontally mounted antenna subsystem module (ASM).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.
Overview of Uplink Power Control Embodiments of the invention include techniques for controlling the uplink power for a terminal's antenna in a satellite communication system. In one embodiment, controlling the uplink power of a terminal's antenna impacts the user's "upload" data rate. In one embodiment, one goal is to be as close to the PSD limit as possible while holding enough margin to be confident that the PSD will not exceed pre-calculated limits, and the closer the PSD is to the limit, more modulation and coding schemes may be used which allow for a larger data rate to be achieved. Techniques described herein enable a very dynamic Uplink Power Control (UPC) to keep up with fast changing sidelobe content in a dynamic tracking environment.

In one embodiment, the UPC is performed using the Power Spectral Density (PSD) limit. The PSD of an antenna is defined as the Equivalent Isotropic Radiated Power (EIRP) divided by the ratio of bandwidth of the transmitted signal versus a designated bandwidth per the regulatory body. Different space regulations (e.g., FCC, ITU, etc.) have different standards and maximum allowances for PSD. For example, the FCC, which regulates the space and frequency over the United States, has a density requirement of dBW/4 kHz bandwidth, whereas the ITU has a density requirement in units of dBW/40 khz and governs most of the rest of the world. Therefore, for different locations on the Earth, in one embodiment, the terminal is aware of the region in which it is located, and with that, what requirements it must follow. It is also not uncommon for a satellite operator to set its own PSD limits for a satellite that may be more strict than the limit set by the ruling space regulation committee.

In one embodiment, the satellite antenna is a flat-panel antenna that electronically steers a beam using antenna elements. Examples of such an antenna are described in more detail below. In one embodiment, the antenna updates its beam shape at predetermined intervals (e.g., every 4 msec). This causes its radiation pattern to update. Every time such an update to the radiation pattern occurs, the sidelobes and maximum allowed PSD may change. In one embodiment, the UPC is performed to ensure that the maximum allowed PSD is not exceeded.

A simple method to perform UPC using PSD is to find the worst-case radiation pattern and sidelobes for a beam from a transmitting antenna, and then set that as the maximum PSD for all theta/scan conditions. In one embodiment of the antenna, this smallest maximum PSD occurs at an extreme case of high scan and skew angles. Therefore, if the worst-case PSD were applied to all scenarios, connectivity would not be possible due to the PSD limit being below what is required by the modem to transmit data.

To conform to the regulations of both the FCC and ITU while also being able to transmit data, in one embodiment, PSD maximum value tables are generated in 5-degree steps where all radiation patterns within the constraints of the specific cell are analyzed and a maximum PSD is evaluated to ensure compliance for all operation conditions. In one embodiment, there are four tables, two for the FCC and two more for ITU regulations. In one embodiment, the antenna (e.g., ASM) performs differently depending on whether it is transmitting in horizontal or vertical polarization, and the radiation patterns are different enough where separating the two polarizations into two different sets of requirements allows for a higher EIRP transmission. Tables 1A and 1B below is an example of one of the FCC tables.

TABLE 1A

| | SKEW | | | | | | | | |
|---|---|---|---|---|---|---|---|---|---|
| SCAN | 0 | 5 | 10 | 15 | 20 | 25 | 30 | 35 | 40 |
| 0 | 15.22 | 15.72 | 15.72 | 14.71 | 13.45 | 13.2 | 13.69 | 13.94 | 12.93 |
| 5 | 15.81 | 15.31 | 15.06 | 15.06 | 14.56 | 14.06 | 14.31 | 14.81 | 14.81 |
| 10 | 15.44 | 15.44 | 15.44 | 15.19 | 14.94 | 15.19 | 16.19 | 15.44 | 16.44 |
| 15 | 15.46 | 15.21 | 15.21 | 15.21 | 15.46 | 15.46 | 15.96 | 15.96 | 16.21 |
| 20 | 15.26 | 15.01 | 15.01 | 14.76 | 14.26 | 14.26 | 15.01 | 15.51 | 15.76 |
| 25 | 15.45 | 15.2 | 14.95 | 14.7 | 14.2 | 13.95 | 14.45 | 15.45 | 15.45 |
| 30 | 15.64 | 15.89 | 15.64 | 15.39 | 14.64 | 14.39 | 14.89 | 13.64 | 15.39 |
| 35 | 16.15 | 16.15 | 15.65 | 13.9 | 12.65 | 11.9 | 11.65 | 11.9 | 10.48 |

TABLE 1A-continued

| | SKEW | | | | | | | | |
|---|---|---|---|---|---|---|---|---|---|
| SCAN | 0 | 5 | 10 | 15 | 20 | 25 | 30 | 35 | 40 |
| 40 | 15.23 | 15.48 | 15.23 | 13.98 | 11.73 | 10.48 | 9.73 | 9.73 | 10.48 |
| 45 | 12.91 | 13.91 | 15.66 | 15.16 | 12.91 | 11.41 | 10.41 | 10.16 | 10.91 |
| 50 | 14.49 | 15.24 | 14.99 | 14.49 | 13.99 | 12.49 | 11.49 | 10.99 | 10.99 |
| 55 | 15.52 | 15.27 | 14.77 | 14.27 | 12.52 | 11.02 | 10.02 | 9.52 | 9.27 |
| 60 | 15.41 | 15.66 | 15.16 | 14.66 | 13.91 | 12.16 | 10.41 | 9.16 | 8.41 |
| 65 | 15.53 | 15.28 | 15.03 | 14.53 | 13.03 | 11.28 | 9.78 | 8.28 | 7.03 |
| 70 | 14.59 | 14.84 | 14.59 | 13.09 | 11.34 | 10.09 | 8.59 | 7.34 | 6.09 |
| 75 | 11.38 | 11.38 | 11.13 | 10.63 | 10.88 | 9.63 | 8.13 | 6.88 | 5.63 |

TABLE 1B

| | 45 | | | | | | | | |
|---|---|---|---|---|---|---|---|---|---|
| SCAN | 50 | 55 | 60 | 65 | 70 | 75 | 80 | 85 | 90 |
| 0 | 15.42 | 14.91 | 14.9 | 15.89 | 16.38 | 16.88 | 15.88 | 14.88 | 14.13 |
| 5 | 16.06 | 14.81 | 15.81 | 15.56 | 14.81 | 14.06 | 13.56 | 13.31 | 13.06 |
| 10 | 16.44 | 15.19 | 14.94 | 14.94 | 14.44 | 13.69 | 13.44 | 12.94 | 12.94 |
| 15 | 16.21 | 15.21 | 15.46 | 14.96 | 14.21 | 13.71 | 13.21 | 12.96 | 12.96 |
| 20 | 16.26 | 16.01 | 14.76 | 14.26 | 14.26 | 13.76 | 13.26 | 13.01 | 13.01 |
| 25 | 15.45 | 13.95 | 13.2 | 12.45 | 12.45 | 12.95 | 12.95 | 12.7 | 12.7 |
| 30 | 15.39 | 14.14 | 12.64 | 11.89 | 11.89 | 12.39 | 12.39 | 12.39 | 12.64 |
| 35 | 14.65 | 14.4 | 13.15 | 11.65 | 11.4 | 11.65 | 12.65 | 12.4 | 12.4 |
| 40 | 13.48 | 13.23 | 10.98 | 9.98 | 10.48 | 11.98 | 11.73 | 11.48 | 11.23 |
| 45 | 13.91 | 13.16 | 10.66 | 8.91 | 8.16 | 8.66 | 10.41 | 10.91 | 10.66 |
| 50 | 12.49 | 12.49 | 11.24 | 8.74 | 6.99 | 6.74 | 8.24 | 9.99 | 9.74 |
| 55 | 11.27 | 11.27 | 10.02 | 7.02 | 5.52 | 5.52 | 7.02 | 8.52 | 8.27 |
| 60 | 8.16 | 9.91 | 10.16 | 8.16 | 4.91 | 4.91 | 4.91 | 6.91 | 6.91 |
| 65 | 6.28 | 6.78 | 8.28 | 7.03 | 5.28 | 4.03 | 4.03 | 6.03 | 5.78 |
| 70 | 3.84 | 3.09 | 3.34 | 5.59 | 6.09 | 5.34 | 4.09 | 3.84 | 4.34 |
| 75 | 3.38 | 2.88 | 3.63 | 5.38 | 4.63 | 3.88 | 3.38 | 3.63 | 2.88 |

In one embodiment, each cell in tables 1A and 1B are the maximum PSD allowed for that theta/scan condition. The maximum PSD would be the value where the antenna's current skew and theta intersect (e.g. skew 20 degrees, theta 45 degrees would be a PSD of 12.91 dBW/4 kHz). In one embodiment, this value is used to control the modem to ensure that the combination of bandwidth and transmit power is below the specified PSD limit. As the antenna moves, the scan and skew will update to new values, where the PSD value may change. In one embodiment, if there is enough change where either the scan or skew value moves to a different cell in tables 1A and 1B, the new maximum PSD is used to control the modem so that the modem controls its power to ensure that the combination of bandwidth and transmit power is below the specified PSD limit once the signal is transmitted from the antenna. In one embodiment, obtaining new PSD maximum values for controlling the modem is dynamic and nearly instantaneous.

Figure 9:
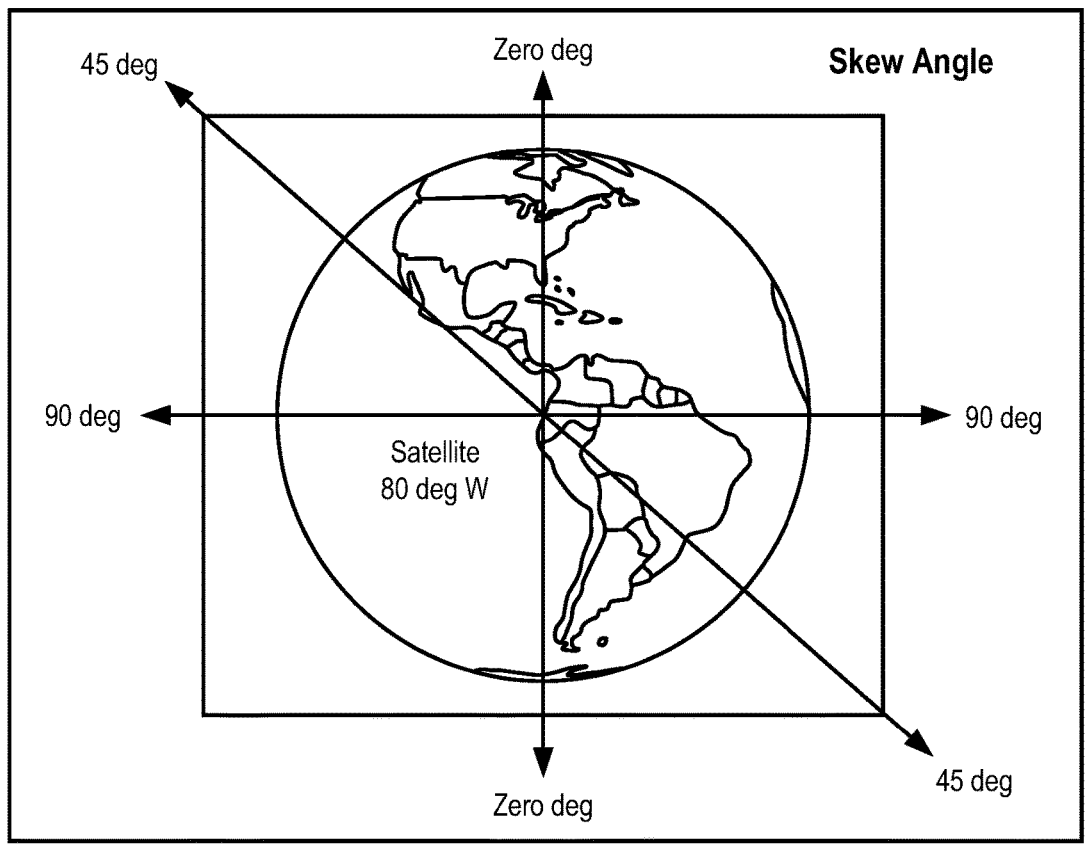
FIG. 9 illustrates skew angle as a function of terminal location on Earth.

FIG. 1 illustrates concepts of both scan and skew. Referring to FIG. 1, scan is the angle between the vector of the antennas' boresight and broadside vectors. The electronically steered antenna (ESA) gain and antenna beam width depend on the effective area of the antenna in the direction of the satellite. As the scan angle increases, the effective area decreases which results in both lower gain and a wider beam along the axis of the reduced area. Since only the beam will widen on the axis of reduced effective area, the location of the terminal with respect to the satellite also affects the maximum PSD. This is because as the terminal moves closer to the equator, the axis of reduced effective area becomes more in line with the geostationary arc, which means that the beam widening falls along the GEO arc and the widening of the beam will introduce unwanted noise to adjacent satellites. This angle is skew, and typically as both scan and skew angles increase, the power is reduced to ensure the antenna is not interfering with neighboring satellites (this is noticeable in the bottom right section of the table above). Skew angle is defined by the terminal's location on Earth relative to the location of the satellite in space. Any point on the globe that is on the same line of longitude as the satellite has a skew angle of zero. Any point along the equator has a skew angle of 90 degrees. FIG. 9 illustrates skew angle as a function of terminal location on the Earth.

Figure 2:
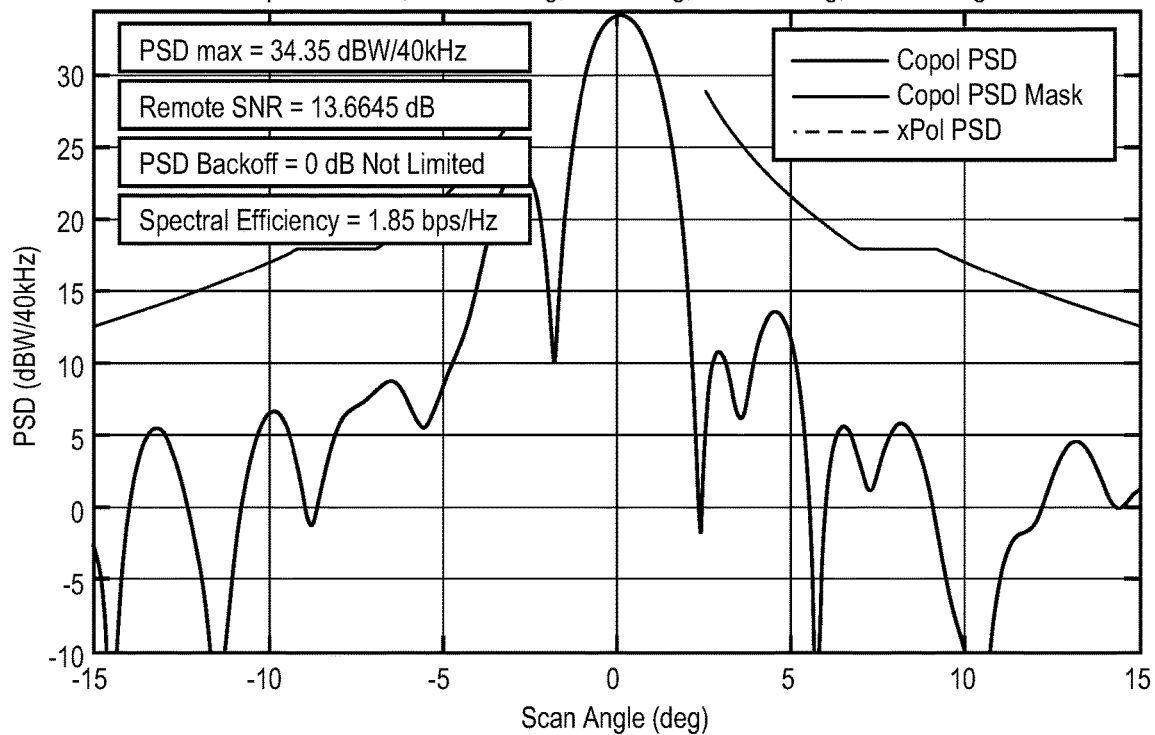
FIGS. 2-5 illustrate different radiation patterns measured along the geostationary arc axis.

FIGS. 2-5 illustrate different radiation patterns measured along the geostationary arc axis. To better illustrate the beam widening, FIG. 2 is focused only on the main lobe and first few sidelobes. Note that the full analysis evaluates from −180 to +180 degrees.

Figure 3:
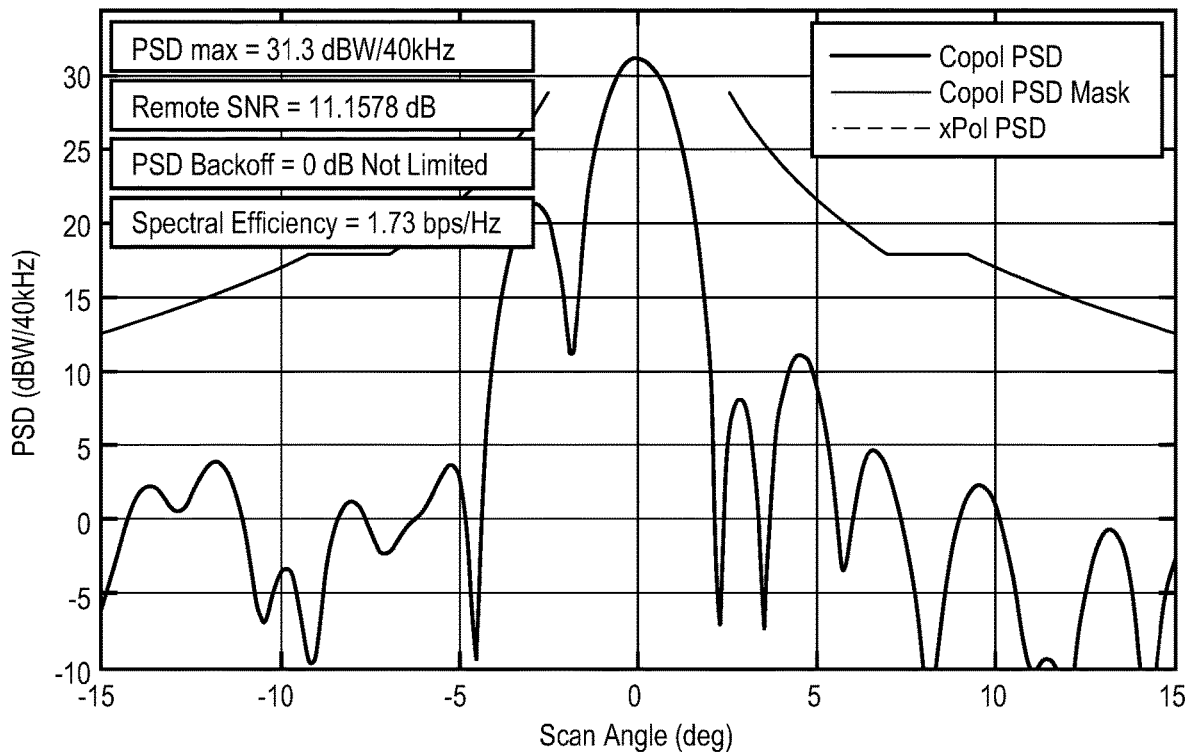

The first image in FIG. 2 is for a scan of 0 degrees (which is defined herein as theta) and a skew of 0 degrees. As the PSD in the top box is dBW/40 kHz, this is evaluating against the ITU specification. This is a typical beam width for one embodiment of an antenna subsystem module (ASM). For purposes herein, in one embodiment, an ASM is a stackup and set of antenna components that includes a radome, TFT substrate, dipole, elements, feed assembly, control electronics and connectors, and a backshell, and the terminal comprises the ASM, a modem, an LNB, and a BUC. As theta increases, and the skew stays at 0 degrees (as shown in FIG. 3), the beam shape does not change along the geostationary arc since the beam widening is orthogonal to the GEO arc.

Figure 4:
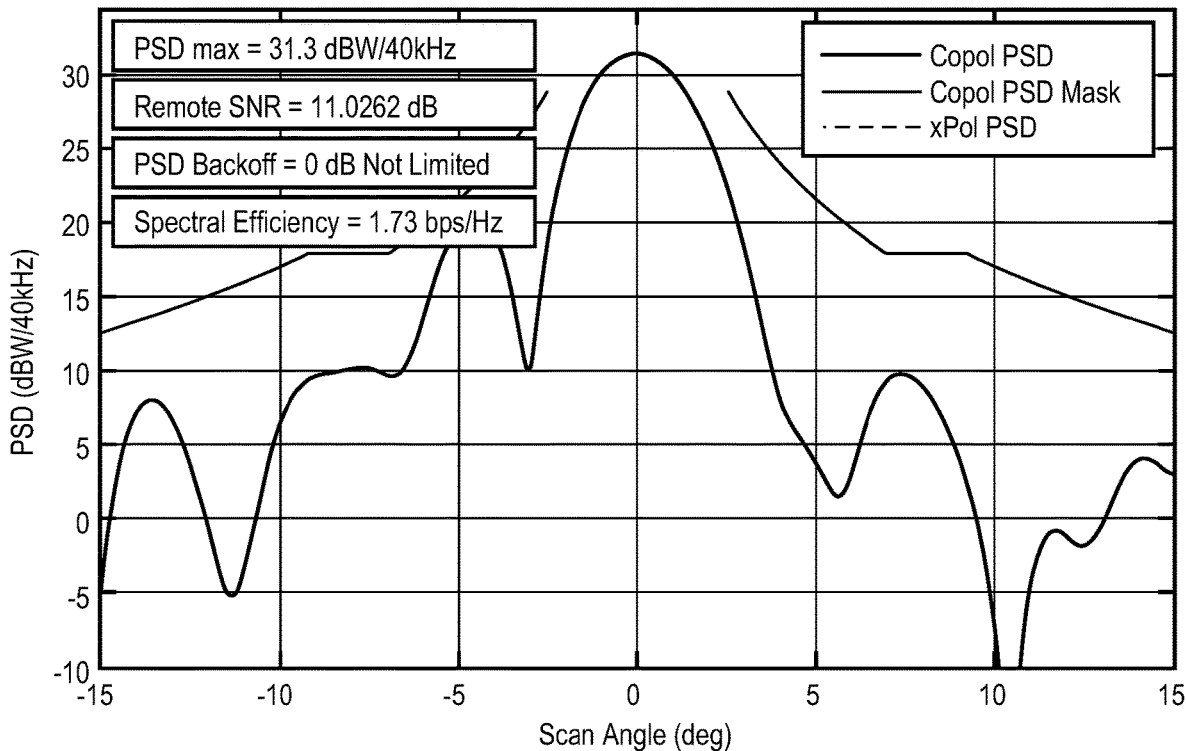
Figure 5:
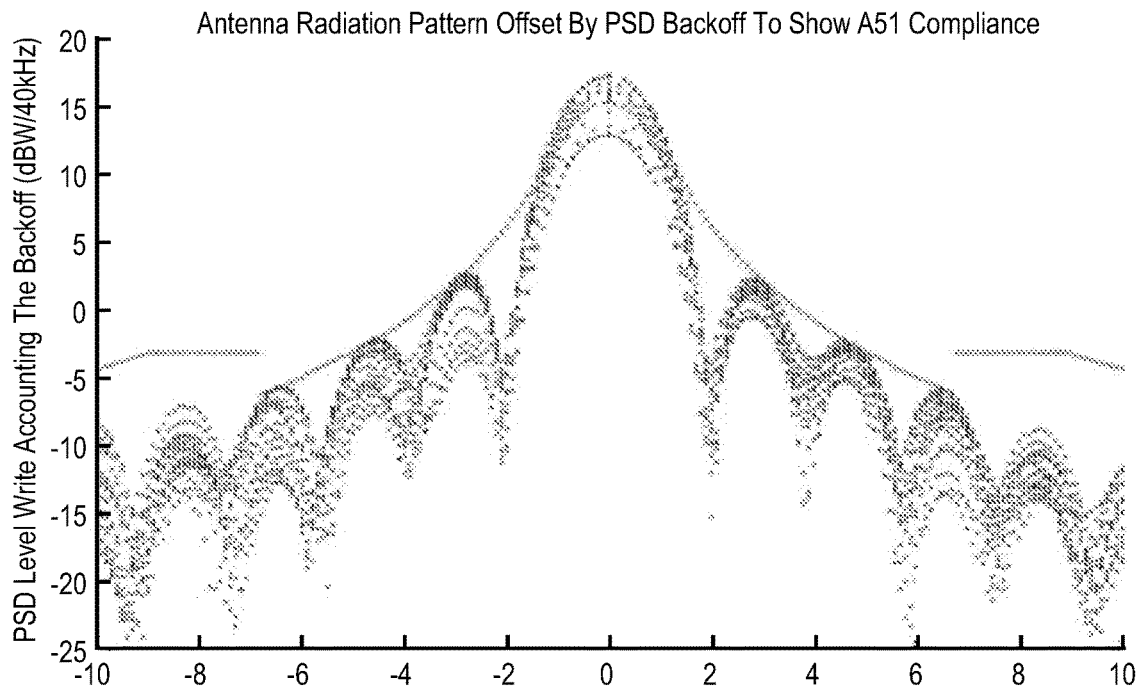

However, as skew increases along with scan, the beam widening is along the GEO arc and the main lobe and sidelobes begin to widen, pushing the previous compliant radiation pattern towards the specification PSD mask until it exceeds the PSD mask. FIGS. 4 and 5 illustrate different skews. FIG. 4 is an intermediate skew where the PSD mask is not violated, but the beam widening is noticeable, and FIG. 5 is when the mask is violated and a PSD back-off is required to stay compliant. The amount of back-off is noted in FIGS. 4 and 5 as "PSD Back-off". Note that the roll-off to the right side of FIGS. 4 and 5 is due to those angles being below the face of the antenna where no transmissions are possible.

In one embodiment, the flat panel antenna does not need to point directly to the satellite it is communicating with because it is able to electronically steer the beam to keep it pointing at the satellite regardless of terminal location or antenna orientation. Steering the beam this way creates changes in gain and beam shape as a function of the theta angle.

Theta at zero degrees is a beam leaving the face of the antenna at a vector that is normal to the antenna surface, increasing to a value of 90 degrees which is parallel to the surface of the antenna. As the theta angle increases, the beam elongates in the direction parallel to a vector in a plane the direction the beam is angled. The location of the antenna on the Earth relative to the position of the satellite defines a "skew angle", which determines the shape of the beam as seen relative to the GEO arc.

This elongation of the beam can cause part of the energy of the antenna's radiation pattern being transmitted to cause adjacent satellite interference (ASI). When in this state, the terminal must reduce power to be below some maximum threshold to avoid ASI and regulatory violations.

Figure 6:
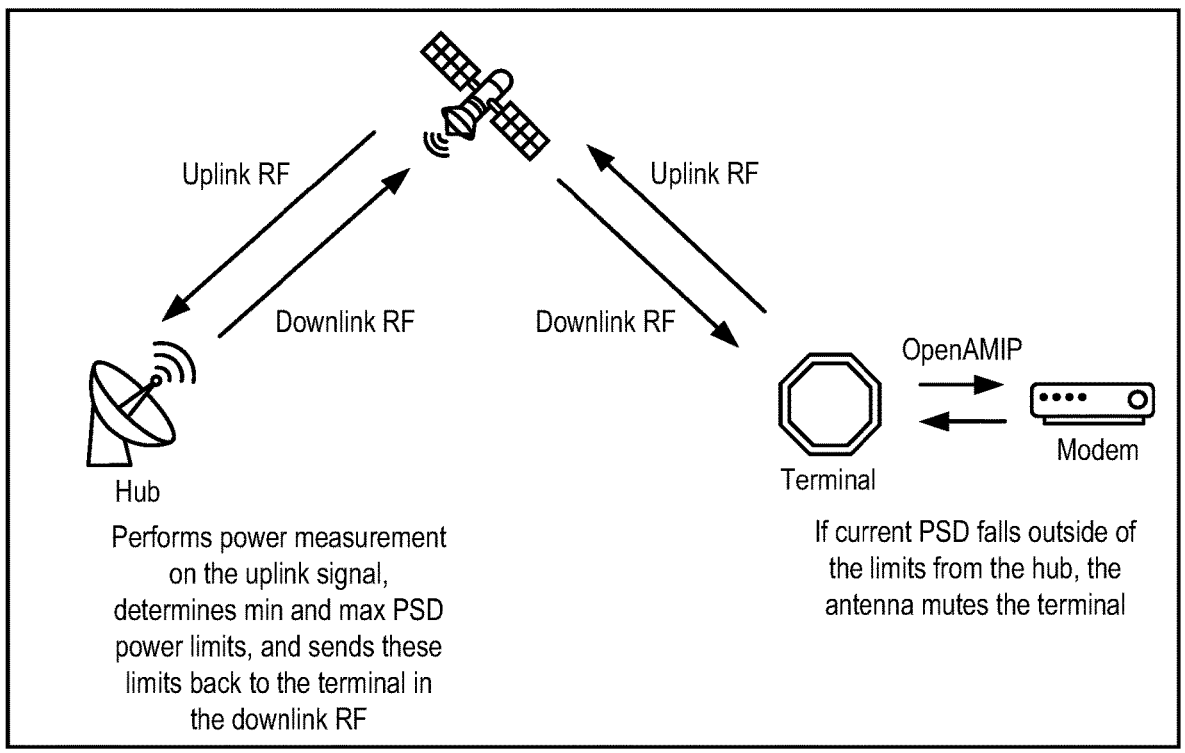
FIG. 6 illustrates an example of a closed-loop uplink power control (UPC) process.

In one solution to this problem, some networks provide a closed-loop control for uplink power as part of its UPC. Measurements are made on the network hub to determine minimum and maximum power spectral density (PSD) which are then sent to the modem, which forwards this information on to the antenna. The antenna then calculates the current transmitted PSD, and if it falls outside of the limits the terminal is muted. FIG. 6 illustrates an example of a closed-loop UPC process. Other network solutions do not provide this closed loop control, so the terminal does not know what the limit of the power spectral density (PSD) value can be without muting. In such cases, a very conservative algorithm is used that limits PSD to the worst case possible by considering all theta and skew angles. However, there are situations where the terminal's output power could be safely increased above the limits found in the PSD table without causing ASI or regulatory violations. Techniques described herein provide possible ways to achieve this higher performance without network closed-loop control.

Figure 7:
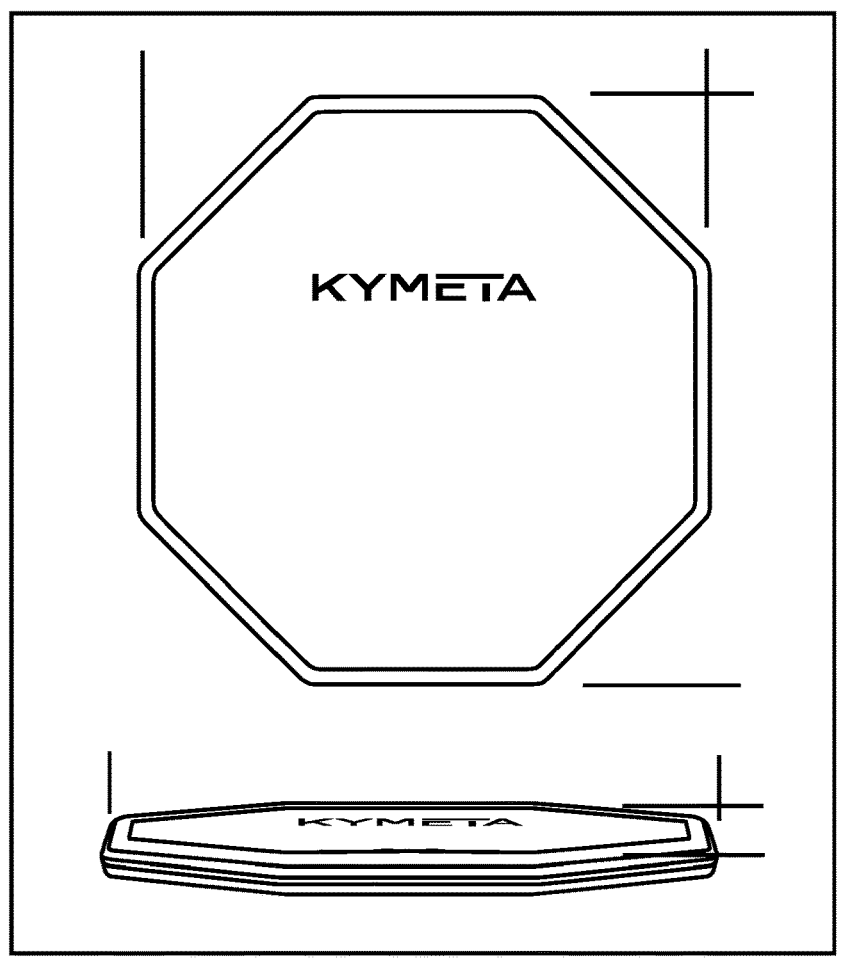
FIG. 7 is an example of the effective width and height as a function of elevation angle for one embodiment of an ASM.

In one embodiment, the beam shape from the electronically steered flat panel antenna is based on the effective area of the antenna, which is the combination of effective height and width that is visible to the satellite through which the Earth terminal is communicating. FIG. 7 is an example of the effective width and height as a function of theta for one embodiment of an ASM. As the effective area of the ASM decreases from the perspective of the satellite the beam will widen along the axis of the decreased area. As the ASM is tilted, the look angle (theta) increases and the effective area decreases.

Figure 8:
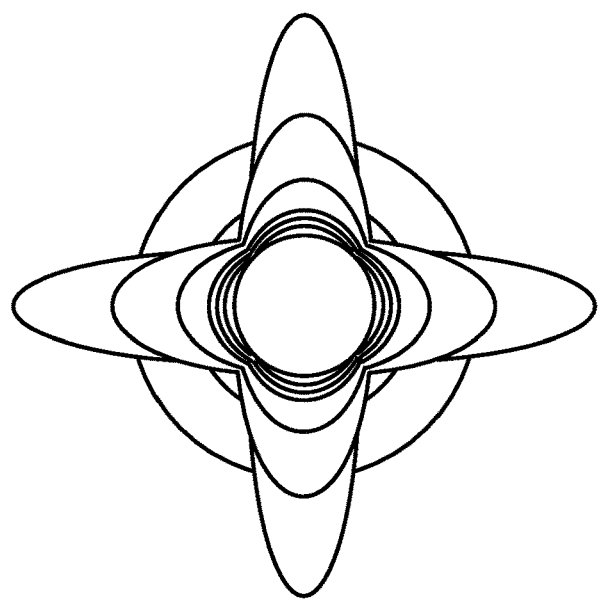
FIG. 8 illustrates multiple different beams and a representative amount of their beam spreading as theta increases.

FIG. 8 illustrates multiple beam shapes that may be generated from one embodiment of an electronically steered antenna depending on orientation and theta, such as those described, for example, in more detail below. When the beam is generated when the antenna is broadside (normal to the antenna surface), the beam shape is round. As the theta angle increases, the beam will widen in the direction which the antenna presents less surface area. In the case of the antenna of FIG. 7 there is less surface area presented vertically (with respect to this page), so the beam would elongate in the vertical direction.

In general, if a flat panel antenna is located at a place on Earth with high skew and has a beam that is non-circular, the chances of ASI happening are greater.

Examples of UPC Processes

In one embodiment, UPC may be performed by a user terminal antenna itself. In other words, the UPC process is performed without confirming power measurements using the hub, which is generally controlled by a network provider separate from the antenna/terminal producer. Because the hub is not involved in the UPC process, the monitoring on the hub side and the passing messages back through a link with 1-2 seconds of latency is avoided as well (i.e., the process is not "laggy").

In one embodiment, the UPC process derives a maximum modem output power in real-time. This is done by obtaining a maximum PSD value and using that value to determine the maximum modem output power. In one embodiment, this determination is performed on the antenna by a controller (e.g., one or more processors). The maximum modem output power is signaled to the modem, which limits its output power to below the specified maximum, thereby ensuring that the terminal operates in a way that does not exceed the PSD limit. Note that because the modem receives a signal regarding its maximum allowable output power from a controller on the terminal and controls its output power accordingly (and thus does not have to determine its output power), embodiments of this invention are modem/network agnostic and thus can be used by any modem provider as long as they possess the capabilities to implement this on their products.

Figure 10:
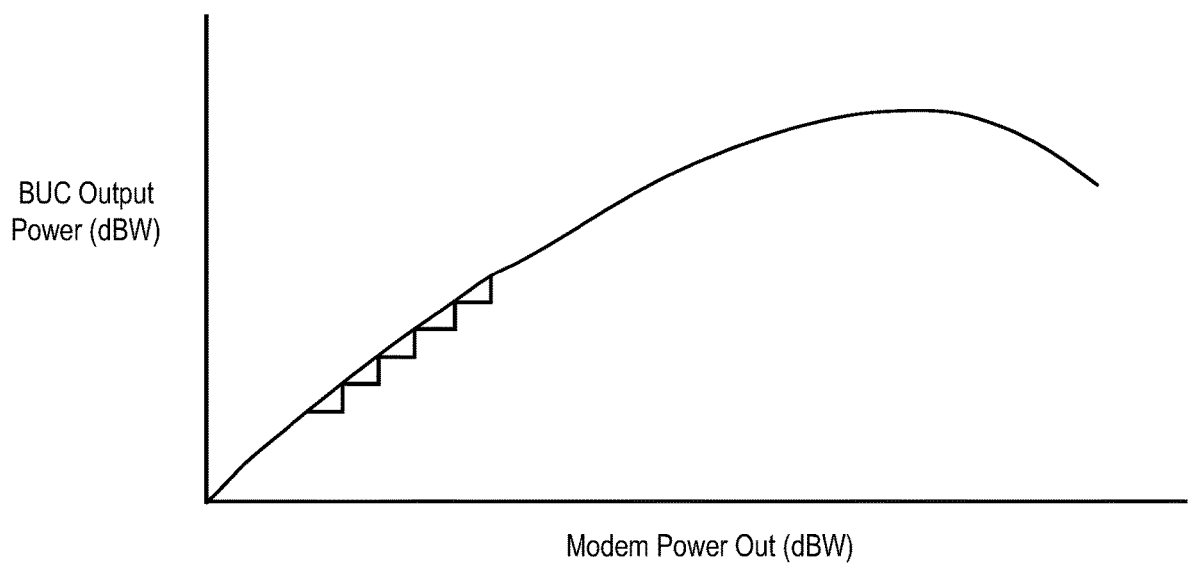
FIG. 10 illustrates power transfer curve relating block upconverter (BUC) output power to modem power out.

There are a number of key innovations associated with the UPC techniques. First, in one embodiment, these techniques use the results from the P1dB curve which is run during terminal commissioning to understand a relationship between modem output power and the terminal's block upconverter (BUC) output power. By relating the modem output power to the BUC output power, a maximum modem output power can be calculated for the current scan and skew condition of the ASM by correlating a maximum PSD transmitted out of the antenna, to a maximum BUC power (or power density), which may then be correlated to a modem power (or PSD) by the implementation discussed above in this paragraph. FIG. 10 illustrates an example of a power transfer curve relating the BUC output power to modem output power.

By increasing the power out of the modem by a set level (e.g., 1 dB) and recording the response from the BUC, an output power of the modem is mapped to the BUC for the entire power curve of the BUC, such as shown in FIG. 10. In one embodiment, this is important since the saturation point of the BUC is known and a particular BUC power to a modem power relationship can be determined which will stay consistent as long as Tx cables and the set gain within the BUC are not changed. If the BUC gain is changed, the curve may be offset, meaning that UPC would still be possible, but the offset will need to be considered if/when fully implemented. In one embodiment, some margin is held for temperature, unit variation, etc.

Once that curve is known, a reverse calculation is made of the maximum power required if the modem passes the ASM the symbol rate and/or bandwidth (e.g., transmit power). In one embodiment, these techniques include receiving the current symbol rate from the modem through a message (e.g., OpenAMIP message, etc.).

As another innovation, in one embodiment, the UPC process includes sending a message to a modem that states the maximum allowable modem power to be PSD compliant. That is, the maximum modem output power is sent to the modem using a single message. In another embodiment, the modem is sent a power density rather than the maximum modem output power. In one embodiment, with the PSD at the output of the ASM and the gain of the ASM, BUC, and cables being known, the ASM translates the Tx PSD to modem PSD without needing the symbol rate from the modem, and the ASM can transmit a single message to the modem in terms of density. In response to such a message, the modem calculates power based on the symbol rate (which the modem knows).

The techniques described herein enable a number of improvements, including, but not limited to, being able to remove the power margin for theta uncertainty based on time delay (because having to go to the hub for UPC is no longer necessary and the margin associated with this delay is avoided), no longer having to rely on the hub infrastructure, which allows for sending required messages to and from the antenna subsystem module (ASM) via a single connection, and is less complicated and more accurate.

The features enable the antenna to no longer need to communicate with the hub, thereby allowing the response to go from seconds to instantaneous. Furthermore, using the techniques disclosed herein enables the loss between the modem and ASM to stay consistent once commissioning has occurred.

Figure 11:
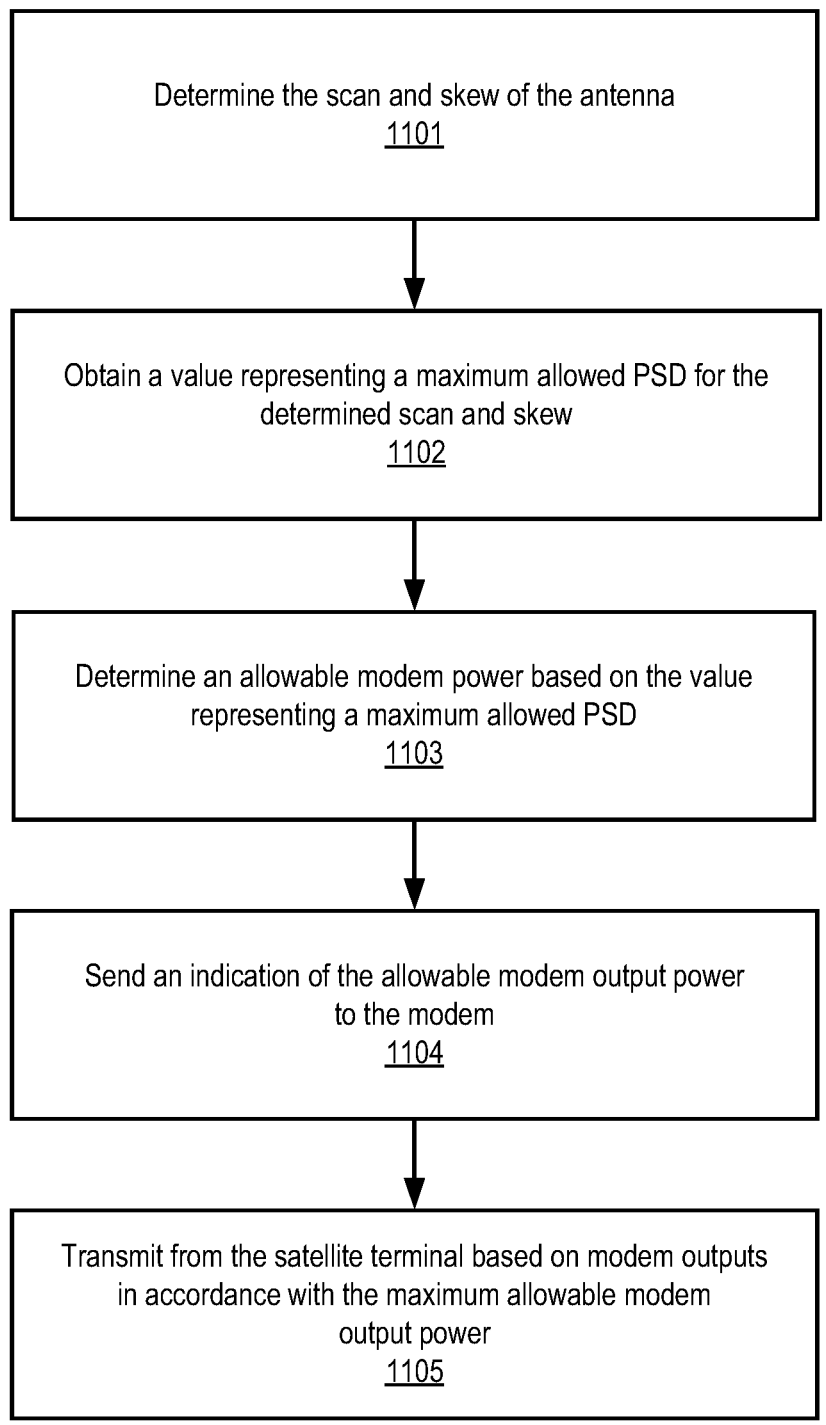
FIG. 11 is a flow diagram of one embodiment of a process for controlling a satellite antenna in a satellite communication system.

FIG. 11 is a flow diagram of one embodiment of a process for controlling a satellite antenna in a satellite communication system. In one embodiment, the process is performed by processing logic that may comprise hardware (circuitry, dedicated logic, etc.), software (e.g., software running on a chip), firmware, or a combination of the three. In one embodiment, operations of the process of FIG. 11 are performed by a controller, including one or more processors, of the satellite antenna.

Referring to FIG. 11, the process begins by processing logic determining the scan and skew of the antenna (processing logic 1101). In one embodiment, at each beam update interval (e.g., each time the liquid crystal pattern for the liquid crystal (LC) in the antenna elements is updated), the scan and skew of the antenna are calculated. Examples of such antenna elements that may be used on antenna apertures that are part of antenna using one or more power control processes described herein are described in more detail below. Even so, the techniques described herein are not limited to such antenna elements.

Next, processing logic obtains a value representing a maximum allowed PSD for the determined scan and skew (processing logic 1102). The maximum PSD value is that which meets a regulatory limit as described above. In one embodiment, this value is obtained by a controller of the antenna. In one embodiment, the controller is part of the ASM. In one embodiment, the maximum allowed PSD is obtained from a look-up table (e.g., for correct regulatory environment and polarization), such as, for example, those described herein, using the skew and scan values. In one embodiment, the table is stored in a memory in the terminal (e.g., in the ASM) and is accessed by the controller.

After the maximum allowed PSD is obtained, processing logic determines an allowable modem power based on the value representing a maximum allowed PSD (processing logic 1103). In one embodiment, the allowable modem output power is the maximum allowable modem output power, such that the maximum allowed PSD is not exceeded by the antenna if the maximum allowable modem output power is not exceeded by the modem during transmissions from the antenna.

In one embodiment, the controller in the ASM determines the allowable modem power. Since this determination is made by a controller on the antenna, the allowable modem power is determined without communication with a hub in the satellite communication system.

Once the allowable modem power has been determined, processing logic sends an indication of the allowable modem output power to the modem to control the modem (processing block 1104). In one embodiment, the indication comprises a value of the actual modem output power. In another embodiment, the indication comprises an encoded alphanumeric value that the modem uses to determine the allowable modem power. In one embodiment, the encoded alphanumeric value is a modem power density value. In one embodiment, the controller sends the indication of the allowable modem output power to the modem by sending a single message from the ASM of the antenna to the modem.

After sending the indication of the maximum modem output power, processing logic causes the terminal to transmit one or more transmissions based on modem outputs in accordance with the maximum allowable modem output power (processing block 1105). That is, in response to the allowable modem output power (e.g., the maximum allowable modem output power), processing logic controls the power that the modem outputs to the antenna aperture (e.g., an antenna aperture of an ASM) to remain at or below the allowable modem output power. That is, the allowable modem power that is set based on the maximum allowed PSD is used to control the modem, which controls the power being transmitted by the antenna. By doing so, the antenna aperture is ensured of operating within the regulatory limits (e.g., the PSD limit).

Figure 12:
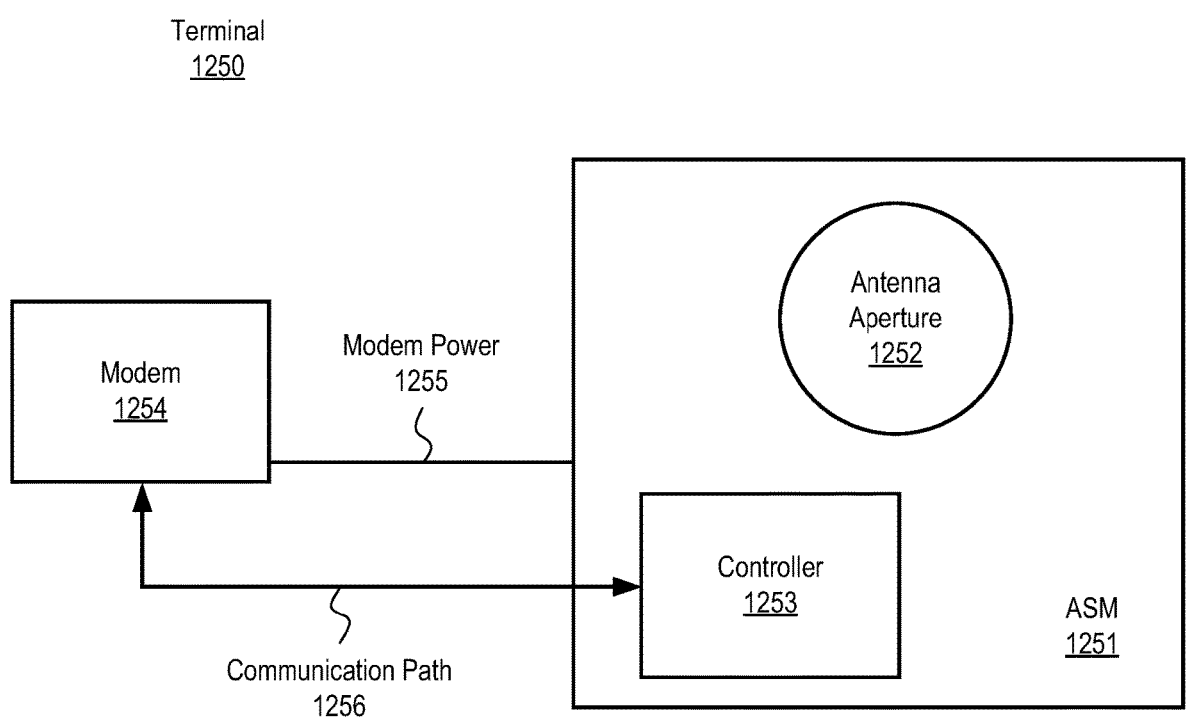
FIG. 12 is a block diagram of a terminal that performs the process of FIG. 11.

FIG. 12 is a block diagram of a terminal for use in a satellite communication system that performs the process of FIG. 11. In one embodiment, the antenna comprises an electronically-steered flat-panel antenna such as, for example, but not limited to, an antenna described in further detail below.

Referring to FIG. 12, terminal 1250 includes an ASM 1251 that includes an antenna aperture 1252. In one embodiment, aperture 1252 has radiating antenna elements operable to radiate radio frequency (RF) signals. In one embodiment, the antenna elements comprise surface scattering metamaterial antenna elements. Examples of such antenna elements are described in more detail below.

Terminal 1250 includes a modem 1254 that is coupled to and provides modem power 1255 to ASM 1251 for transmission and reception of antenna aperture 1252.

Terminal 1250 also includes a controller 1253 coupled to modem 1254. In one embodiment, controller 1253 is communicably coupled to modem 1254 via communication path 1256. Communication path 1256 enables controller 1253 and modem 1254 to exchange communications (e.g., messages). In one embodiment, controller 1253 is part of ASM 1251 that includes aperture 1252.

In one embodiment, controller 1253 is operable to obtain a value representing a maximum allowed PSD for the scan and skew of the aperture, determine an allowable modem power based on the value representing a maximum allowed PSD, and send an indication of the allowable modem output power to the modem. In one embodiment, the allowable modem output power is the maximum allowable modem output power, such that the maximum allowed PSD is not exceeded by the antenna if the maximum allowable modem output power is not exceeded by the modem during transmissions from the antenna. In one embodiment, the allowable modem power is determined without communication with a hub in a satellite communication system in which the antenna transmits satellite communications. In one embodiment, the maximum PSD value is that which meets a regulatory limit.

After determining the allowable modem output power, controller 1253 sends the indication of the allowable modem output power to the modem by sending a single message on communication path 1256 from ASM 1251 to modem 1254.

In response to the maximum allowable modem output power, modem 1254 controls the power it outputs on modem power 1255 to aperture 1252 of ASM 1251 to remain at or below the maximum allowable modem output power. By doing so, antenna 1250 is ensured of operating within the regulatory limits.

The following is one embodiment of a process for calculating the modem maximum power.

1. From the theta that is recorded in the ASM, and the skew that is derived from the latitude and longitude of the ASM and the geolocation of the satellite, a maximum PSD from the PSD table is derived. As an example, if FCC compliance applies, with a theta of 35 and a skew of 20, the table of FIG. 35 is used to obtain a maximum PSD.
2. The maximum PSD for the scenario is 12.9 dBW/4 kHz. By obtaining the current symbol rate from the modem, a maximum power also known as effective isotropic radiated power (EIRP) at the output of the aperture is derived. In one embodiment, the modem provides the symbol rate to a controller in the ASM via one or more messages (e.g., one or more OpenAMIP messages). For this example, it is a 1 MSym carrier. Therefore, the EIRP equals 12.9 plus 10*log(1000/4), which equals 36.88 dBW. In one embodiment, the symbol rate is maintained as constant under network control.
3. The antenna gain is calculated from known performance parameters (with some margin in one embodiment). One example antenna has a gain of 33.5 plus 12*log(cos(theta)), which is 33.5 plus 12*log(cos(35)) and, thus the antenna gain equals 32.46 dBi.
4. Subtracting the antenna gain from EIRP gives a maximum BUC power in dBW. In the example, the BUC power equals 36.88 minus 32.46, which equals 2.34 dBW or approximately 1.7 W.
5. From the power transfer curve of FIG. 10 (in this example) (now with specific values included), a maximum modem power may be derived using the maximum BUC power. For this example, assume the modem power that correlates to a BUC output power of 2.34 dBm is −5 dBm.
6. The modem power (e.g., −5 dBm) is passed to the modem as a do not exceed power level. In one embodiment, the modem power is sent as a single message. In one embodiment, if theta changes significantly, a new power is calculated using the method above. If the modem does not exceed this level and the symbol rate does not change, this will ensure the PSD limit is not exceeded through an automatic uplink power control process while not needing to have two-way communication with the modem and/or the hub, which makes the UPC process to be more modem agnostic. Any modem vendor may adhere to this as long as they are able to receive the message and understand how to incorporate the limit(s) into their network management algorithm.

Figure 13:
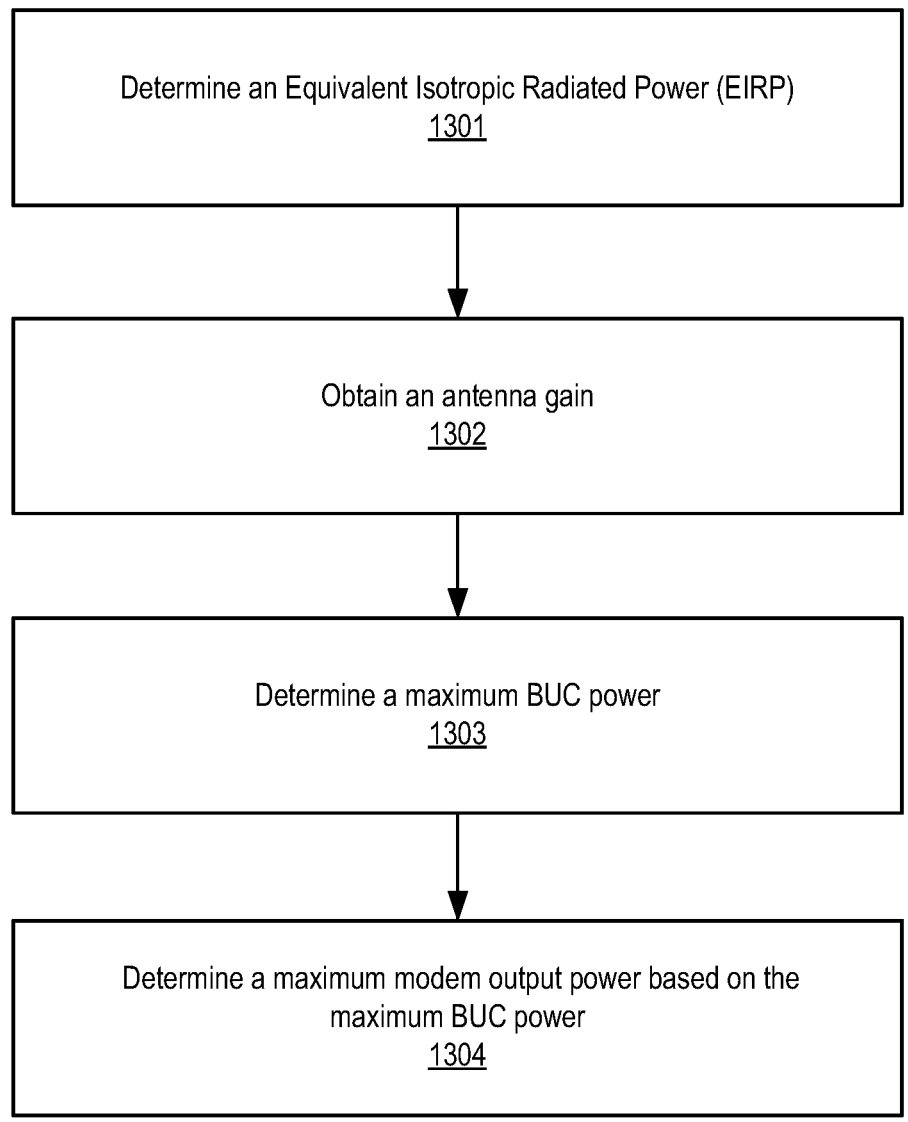
FIG. 13 is a flow diagram of one embodiment of a process for determining the allowable modem power.

FIG. 13 is a flow diagram of one embodiment of a process described above for determining the allowable modem power. In one embodiment, the process is performed by processing logic that may comprise hardware (circuitry, dedicated logic, etc.), software (e.g., software running on a chip), firmware, or a combination of the three. In one embodiment, this process is performed by a controller in an ASM of the terminal.

Referring to FIG. 13, the process begins by processing logic determining an Equivalent Isotropic Radiated Power (EIRP) (processing block 1301) and obtaining an antenna gain (processing block 1302). In one embodiment, obtaining the antenna gain comprises calculating the antenna gain based on theta.

Based on the EIRP and the antenna gain, processing logic determines a maximum BUC power (processing block 1303). In one embodiment, determining the maximum BUC power based on the EIRP and the antenna gain comprises subtracting the antenna gain from the EIRP.

With the maximum operable BUC power, processing logic determines a maximum modem output power based on the maximum operable BUC power (processing block 1304). In one embodiment, determining the maximum (operable) modem output power is based on a power transfer curve of the BUC power to modem power relationship.

Once the maximum modem output power has been determined based on the maximum (operable) BUC power, processing logic sends to the modem the indication of the maximum modem output power that can be used. In one embodiment, processing logic sends a single message from an ASM of the terminal to the modem to indicate the maximum modem output power to the modem.

Figure 14:
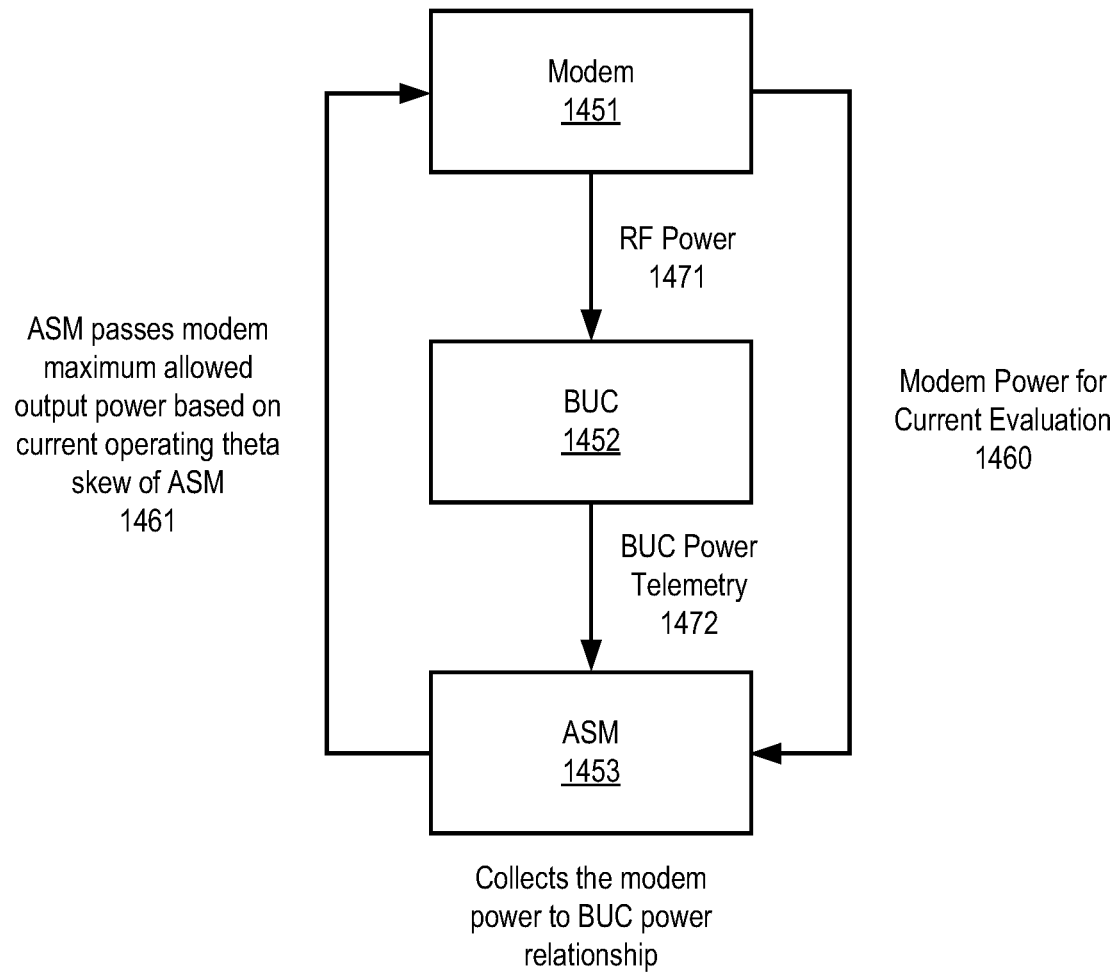
FIG. 14 illustrates a data flow diagram depicting one embodiment of a UPC process.

FIG. 14 illustrates a data flow diagram depicting a UPC process. In one embodiment, the process is performed by processing logic that may comprise hardware (circuitry, dedicated logic, etc.), software (e.g., software running on a chip), firmware, or a combination of the three. In one embodiment, the process is performed by software running in the different units.

Referring to FIG. 14, ASM 1453 collects the modem power to BUC power relationship using the BUC power received from the BUC on a BUC power telemetry line 1472 and using modem power 1460 from modem 1451. Note that in another embodiment, the modem power-to-BUC power relationship is provided to ASM 1453 after it has been determined for the terminal.

In response to this information, ASM 1453 determines a value of the allowed maximum output power 1461 for modem 1451 based on the operating theta and skew of an antenna aperture of ASM 1453 and passes that value to modem 1451. In one embodiment, the allowed maximum output power is determined based on the symbol rate of the carrier on which transmissions from the terminal are being made. In one embodiment, ASM 1453 sends a message to modem 1451 (not actual output power) that would be the limit of modem 1451 to ensure that the terminal's output power (or density depending on embodiment) does not exceed regulatory limits since the gain of BUC 1452, cable loss, and gain of the antenna aperture of ASM 1453 are known.

In response to the allowed maximum output power value, modem 1451 controls its output power 1471 such that its allowed maximum modem output power is not exceeded, thereby ensuring that the PSD limit is not exceeded. In one embodiment, power 1471 output from modem 1451 is at the IF (intermediate frequency) before reaching BUC 1452, where it is then upconverted and amplified to the correct band (e.g., sub-Ku band, etc.) and the desired output power level and then directed to ASM 1453 for transmission. In one embodiment, the power at the output of modem 1471 is calculated so it is the power at the output of the terminal does not exceed the PSD limit.

In one embodiment, a controller (e.g., a controller in ASM 1453) determines the allowable modem power by, as described above, determining an Equivalent Isotropic Radiated Power (EIRP), obtaining an antenna gain, determining a maximum BUC power based on the EIRP and the antenna gain, and determining a maximum modem output power based on the maximum BUC power. In one embodiment, the controller obtains the antenna gain by calculating the antenna gain based on theta. In one embodiment, the controller determines the maximum BUC power based on the EIRP and the antenna gain by subtracting the antenna gain from the EIRP. In one embodiment, the controller determines the maximum modem output power based on the maximum BUC power using a power transfer curve of the BUC power to modem power relationship. Using this method ensures PSD compliance using a less complicated, easier to adopt method for automatic UPC.

In an alternative embodiment, instead of the BUC telemetry line providing the BUC output power, an accurate power reader at the output of the BUC (i.e., additional unit) may be used to determine the power and provide it to the ASM.

In one embodiment, the modem receives all the information and determines its maximum output power. In this case, the modem has access to the BUC output power. In one embodiment, this is accomplished with a telemetry line or other communication pathway directly between the modem and the BUC or via indirect that through one or more other devices. In yet another embodiment, all the information is sent to a device other than the ASM and this device determines the maximum output power for the modem and sends the modem an indication of its maximum output power.

In one embodiment, if the symbol rate is not constant, then the process above is repeated every time there is a new symbol rate or use a minimum available symbol rate to ensure compliance.

Figure 15:
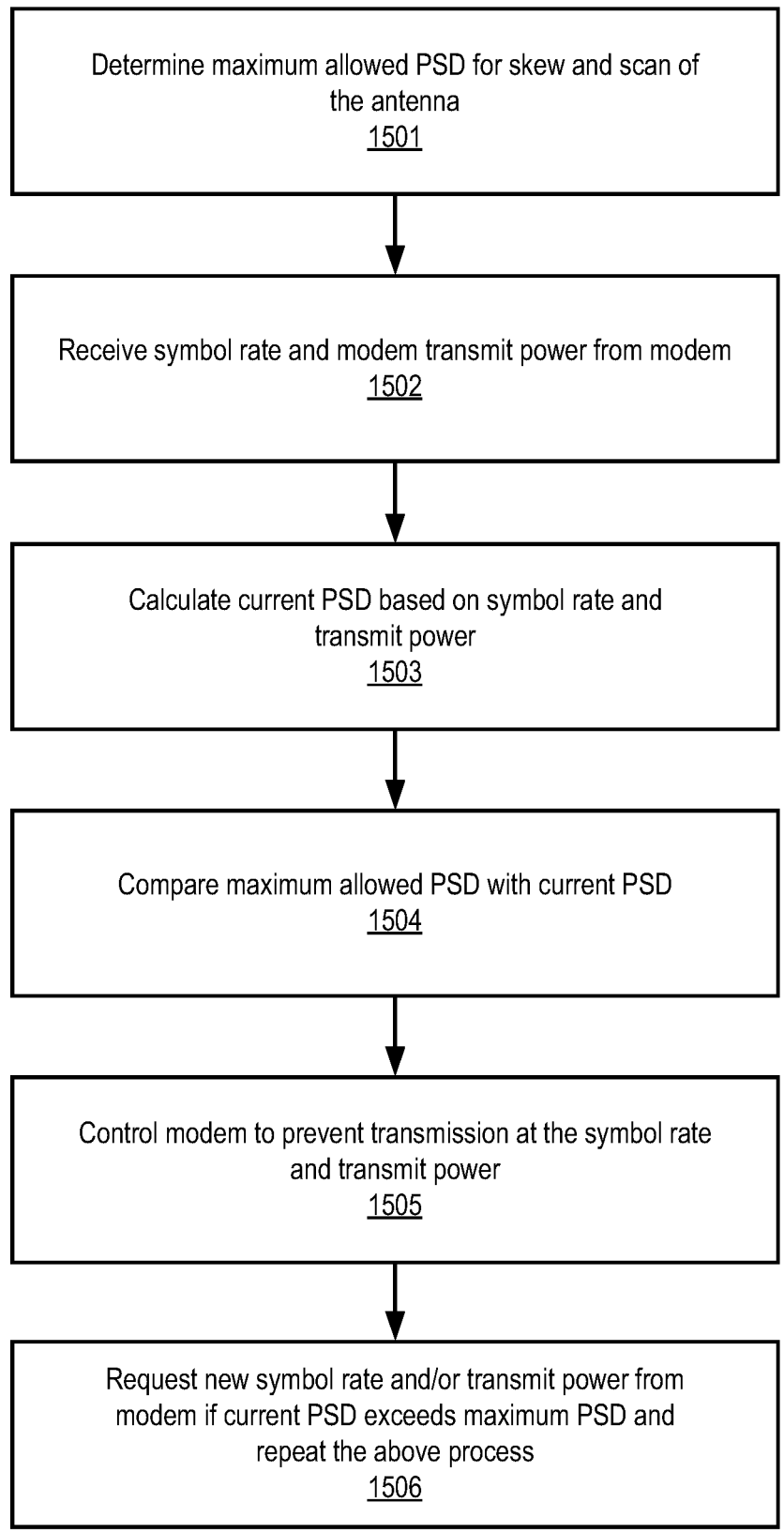
FIG. 15 is a flow diagram of one embodiment of a process for controlling an antenna.

In one embodiment, the above process can be used to determine if the symbol rate and/or transmit power should be changed. FIG. 15 is one embodiment of a process for controlling an antenna. In one embodiment, the process is performed by processing logic that may comprise hardware (circuitry, dedicated logic, etc.), software (e.g., software running on a chip), firmware, or a combination of the three. In one embodiment, this process is performed by a controller on the antenna (e.g., a controller in the ASM of the terminal).

Referring to FIG. 15, the process begins by processing logic determining a maximum allowed PSD for the skew and scan of the antenna (processing block 1501). In one embodiment, this is performed by accessing a look up table, such as described above, and selecting the maximum allowed PSD using the skew and scan of the antenna.

Processing logic also receives a symbol rate and modem transmit power from the modem (processing block 1502). In one embodiment, this information is sent from the modem in one or more messages (e.g., OpenAMIP messages).

Based on the symbol rate and modem transmit power, processing logic calculates a current PSD of the antenna (processing block 1503) and compares it to the maximum allowed PSD (processing block 1504). In one embodiment, processing logic calculates the current PSD using the technique described above in FIG. 13.

Next, processing logic controls the modem to prevent transmission by the antenna at the symbol rate and transmit power if the current PSD is greater than the maximum allowed PSD (processing block 1505). Processing logic also requests a new symbol rate and/or modem transmit power from the modem and repeats the process to see if these new parameters result in a PSD for the antenna that is at or below the maximum allowed PSD (processing block 1506). In one embodiment, processing logic obtains a new symbol rate from a schedule of symbol rates provided by, for example, the modem. Note that this process may be repeated a number of times with different symbol rates and/or modem transmit powers until the antenna's PSD is at or below the maximum allowed PSD.

Other Techniques for Performing Uplink Power Control

There are a number of other embodiments for performing UPC processes by an antenna to ensure that the antenna is at or below the maximum PSD. Some features of these techniques may be used with the UPC and modem control techniques described above.

In one embodiment of a UPC process, the modem determines whether to control its output power based on a received maximum PSD value. In one embodiment, the modem obtains a maximum PSD from a controller or other device on the antenna (e.g., a controller or device in the ASM or a control board, etc.) and uses it to search another look up table (e.g., look up tables for different space regulations, etc.) in a series of look up tables to determine an amount of power the modem can use for transmit and which modcods the modem should use for transmitting. Thus, the series of look up tables are used to translate the maximum PSD communication into a maximum modem output power.

Figure 16:
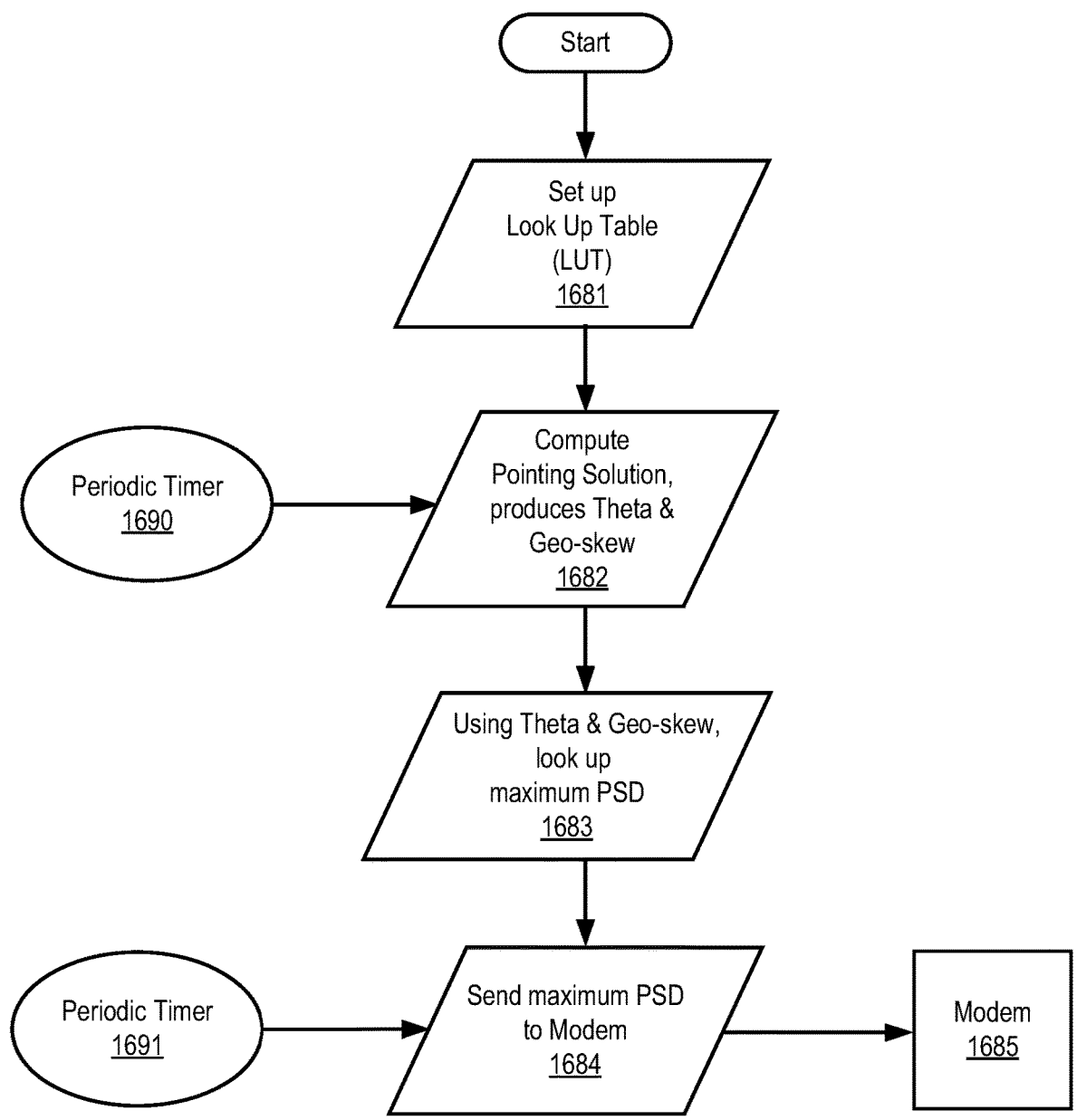
FIG. 16 is a flow diagram of one embodiment of another uplink power control process.

FIG. 16 is a flow diagram of another embodiment of an uplink power control process. In one embodiment, the process is performed by processing logic that may comprise hardware (circuitry, dedicated logic, etc.), software (e.g., software running on a chip), firmware, or a combination of the three.

Referring to FIG. 16, the process begins by processing logic setting up a look up table of maximum PSD values for the scan and skew (processing block 1681). Next, processing logic computes a pointing solution and produces theta and skew values (processing block 1682). In one embodiment, this is performed according to a periodic timer 1690. Using the theta and skew values, processing logic looks up the maximum PSD in the look up table (processing block 1683) and sends the identified maximum PSD to modem 1685 (processing block 1684). In one embodiment, the maximum PSD is sent to the modem according to a periodic timer 1691. In response to the maximum PSD, the modem controls its output power (e.g., mute/unmute; reduce/increase transmit power, etc.).

Figure 17:
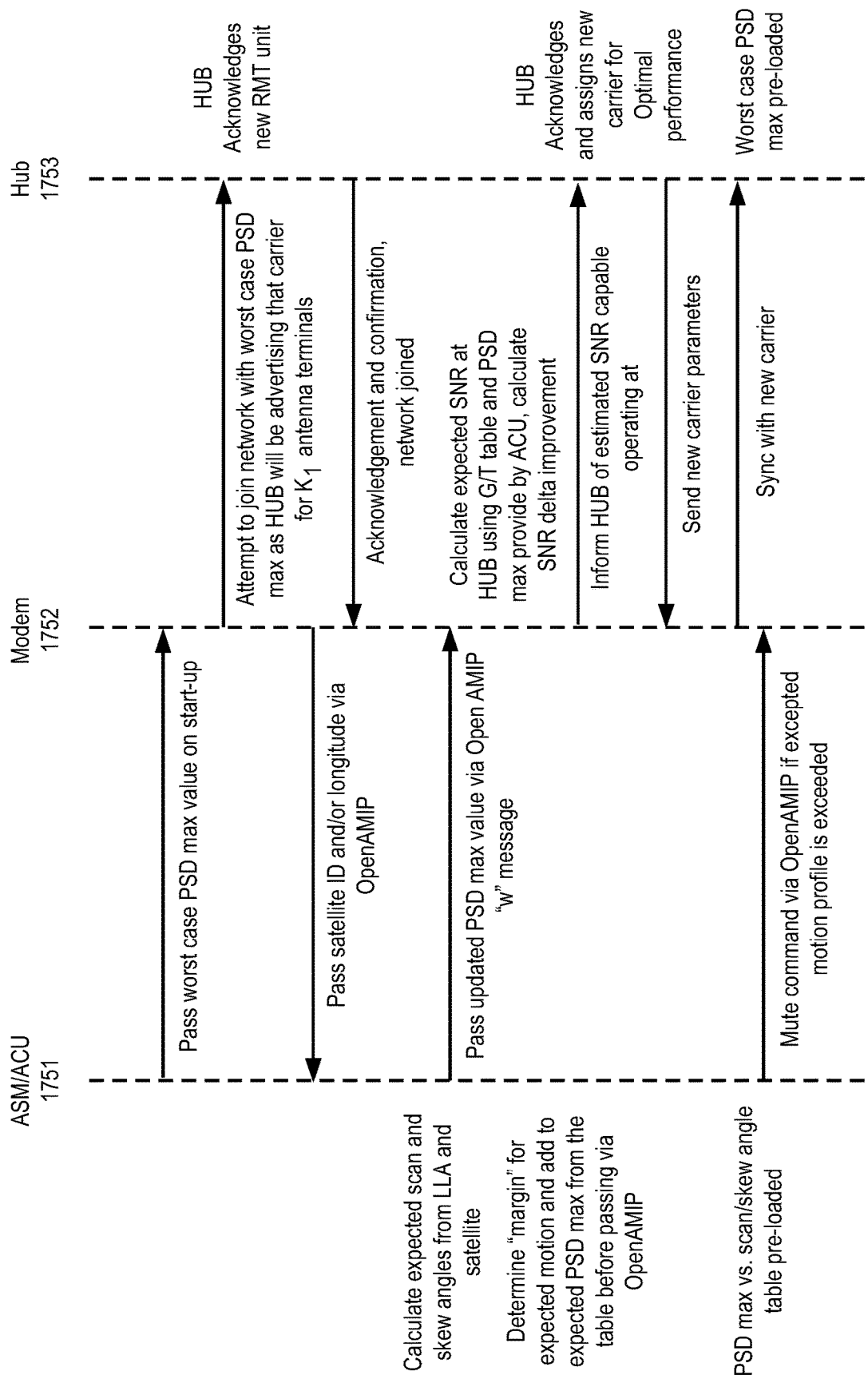
FIG. 17 is a sequence diagram of one embodiment of a UPC process involving a modem and hub in a satellite communication system.

FIG. 17 is a sequence diagram of a UPC process involving a modem and hub in a satellite communication system. Referring to FIG. 17, the ASM 1751 passes the PSD maximum value to modem 1752. In one embodiment, this occurs at startup time for the antenna. In response to the maximum PSD value, modem 1752 attempts to join the communication network while staying within the PSD maximum, while the hub advertises a carrier for antenna terminals. Modem 1752 also sends the satellite ID and/or longitude to ASM 1751 via a message (e.g., an OpenAMIP message) to ASM 1751. Thereafter, hub 1753 sends an acknowledgement and confirmation that modem 1752 has been joined the network.

After joining the network, ASM 1751 calculates expected scan and skew angles from the latitude, longitude, and altitude (LLA) and the satellite. ASM 1751 also determines the "margin" for expected motion of the antenna and adds that to the expected PSD maximum from a look up table before passing the value to modem 1752 via a message (e.g., an OpenAMIP 'w' message).

In response to the PSD maximum value, modem 1752 calculates the expected signal-to-noise ratio (SNR) at hub 1753 using a G/T table and PSD maximum value provided by ASM 1751. Modem 1752 also calculates the SNR delta improvement from expected operational SNR to adjust the PSD to the correct value. For example, if a PSD of 11 dBW/4 kHz is expected to be an SNR of 5 dB, then if the PSD must be 10 dBW/4 kHz the modem will look for a hub SNR of 4 dB.

Once the calculations have been performed, modem 1752 informs hub 1753 of the estimated SNR at which it is capable of operating. In response thereto, hub 1753 acknowledges and assigns new carriers for optimal performance and sends the new carrier parameters to modem 1752. Modem 1752 synchronizes with the new carrier and the PSD maximum value is preloaded into modem 1752. The PSD maximum value versus scan/skew angle table is also preloaded into ASM 1751. ASM 1751 sends modem 1752 a mute command if the expected motion profile is exceeded. In one embodiment, ASM 1751 sends modem 1752 a mute command via a message (e.g., a via OpenAMIP message).

Note that in one embodiment, an antenna manufacturer fully characterizes beam patterns for any applicable scan and skew conditions and generates a table of skew conditions versus maximum PSD allowable to remain compliant.

In another embodiment, a multi-dimensional table (scan, skew, polarization, and regulatory environment) is used to look up maximum PSD.

In one embodiment, Link Budget Analysis (LBA) is used to estimate reference C/N, which represents performance of the link under worst case PSD max conditions. This mode is used for initially joining the network when the terminal does not know its scan and skew conditions, and it guarantees compliance at very low link efficiency. Once the remote joins the network, it checks its current scan and skew conditions, looks up a maximum PSD value in a PSD table and passes the appropriate value over the air to a hub modem. The hub modem compares this value to a reference and determines how much headroom is available. Based on that determination, the hub modem then commands the terminal to add a delta amount of power (e.g., an increase in power), thereby improving link efficiency as a result of higher C/N and higher modcod.

In one embodiment, table look ups to identify a maximum PSD value occur at regular intervals. In one embodiment, this process of table lookup is repeated every 2 seconds.

In one embodiment, another PSD look-up table is added into the antenna terminal software where the two-dimensional table (scan and skew vs. PSD maximum) is broken down into a one-dimensional table referred to herein as a "pseudo-skew" table. This pseudo-skew can then leverage a communication interface (e.g., an OpenAMIP interface) to communicate with the network operator at high speed.

As seen in tables for FCC and ITU jurisdictions, different power levels are allowed in different parts of the world with different satellite environments. In one embodiment, to obtain the correct table for the location in which a satellite antenna is operating, the satellite antenna identifies the jurisdiction in which it resides. This may occur by sending or receiving information about the jurisdiction through one or more messages.

In one embodiment, there are two tables of suggested PSD margin for 5 and 10-degree maximum displacement due to platform motion. These tables are typically created by a network operator. In one embodiment, the values are generated by taking the largest delta between the PSD maximum value of each cell and its 50/100 neighbors.

Figure 18:
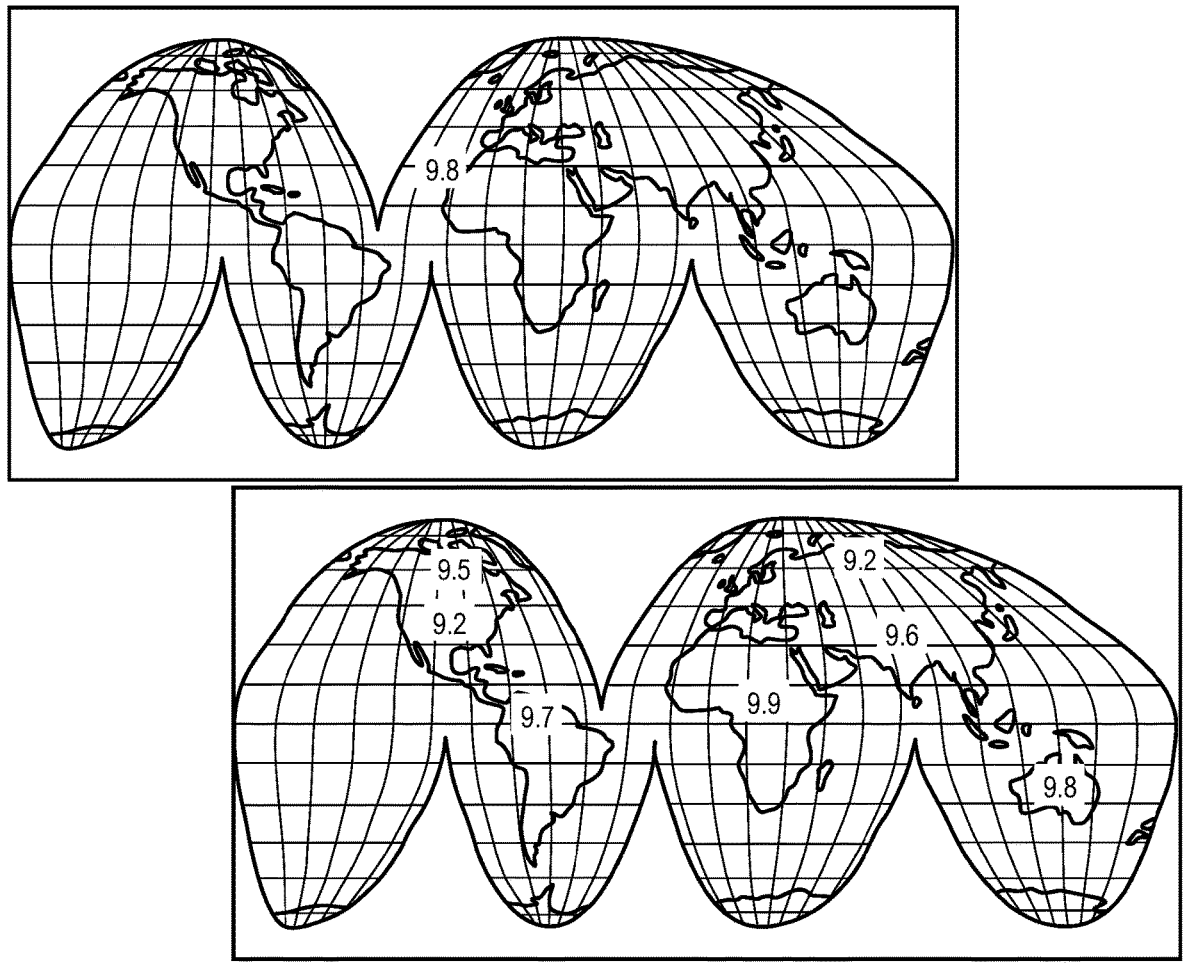
FIG. 18 illustrates an example of PSD limits for different regions.

In one embodiment, the network operator is responsible for determining, on a regional basis, the PSD limit for a terminal. FIG. 18 illustrates an example of PSD limits for different regions. It is the responsibility of the network operator to ensure that terminals only operate in the proper region for the set limit, and the software in the hub and the terminal modem are responsible for selecting a new limit when the terminal changes regions. This is advantageous over methods that have a single limit set for the entire network because terminals within certain regions could obtain higher uplink throughput if the local limit could be higher than the worst case current global limit.

In one embodiment, run-time calculations of the current transmitted PSD are performed based on symbol rate and transmitter power, and the maximum PSD is determined by looking up the value in a table based upon theta and skew. In one embodiment, if the current PSD exceeds the PSD limit, the terminal is muted. In one embodiment, the predefined operating range having a minimum and maximum PSD is determined as described above but the decision to mute happens locally in the ASM instead of in the hub. This is advantageous over implementations that do not actually know what the current PSD value is, and therefore assumes the worst. By knowing the actual PSD value, the terminal can be allowed to raise the power beyond what would be possible now.

Figure 19:
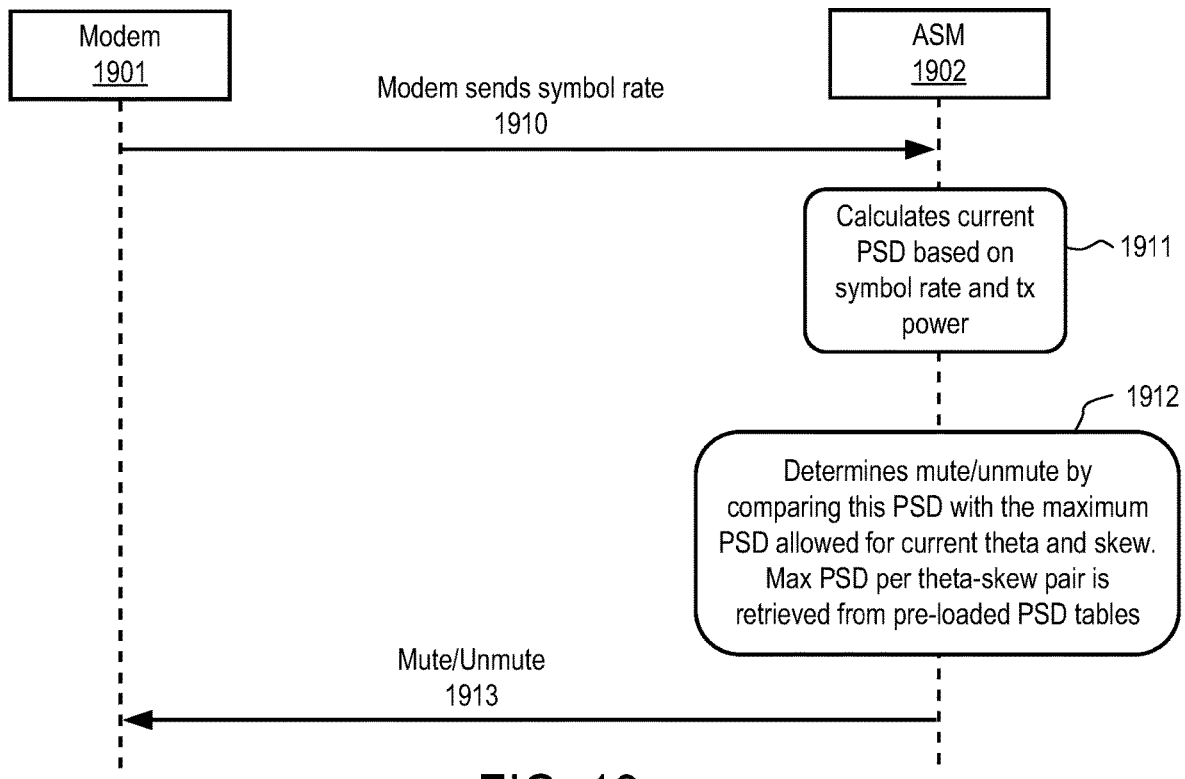
FIG. 19 is a flow diagram of one embodiment of a UPC process that performs a mute operation to mute the terminal based on theta, skew, and bandwidth.

FIG. 19 is a flow diagram of a UPC process that performs a mute operation to mute the terminal based on theta, skew, and bandwidth. In one embodiment, the process is performed by processing logic that may comprise hardware (circuitry, dedicated logic, etc.), software (e.g., software running on a chip), firmware, or a combination of the three. Referring to FIG. 19, modem 1901 sends the symbol rate 1910 to ASM 1902. In response to symbol rate 1910, ASM 1902 calculates the current PSD based on the symbol rate and transmit power (processing block 1911). In one embodiment, the transmit power is derived from a BUC that receives the modem output power. In another embodiment, the transmit power is provided by modem 1901. ASM 1902 also determines whether to mute or unmute modem 1901 by comparing the calculated current PSD value with the maximum PSD allowed for the current theta and skew (processing block 1912). In one embodiment, the maximum PSD value per theta and skew pair is retrieved from the preloaded PSD tables. Based on the result of the determination of whether to mute or unmute modem 1901, ASM 1902 sends a command 1913 telling the modem 1901 to mute or unmute its output power.

In one embodiment, the ASM performs power control based on theta, skew, and transmit (Tx) bandwidth. In one embodiment of this power control process, runtime calculations of the current transmitted PSD are performed based on symbol rate and transmit power, and the maximum PSD is determined by looking up the value in a table based upon theta and skew. If the current PSD exceeds the PSD limit, the modem power is controlled via a programmatic interface to reduce the power to be below the PSD limit. In one embodiment, the predefined operating range is determined as described above but the decision to control the modem power happens locally in the ASM instead of in the hub. This is advantageous over implementations that do not actually know what the current PSD value is, and therefore assumes the worst. By knowing the actual PSD value, the terminal is allowed to raise the power beyond what would be possible now and enables graceful degradation of performance instead of simply muting.

Figure 20:
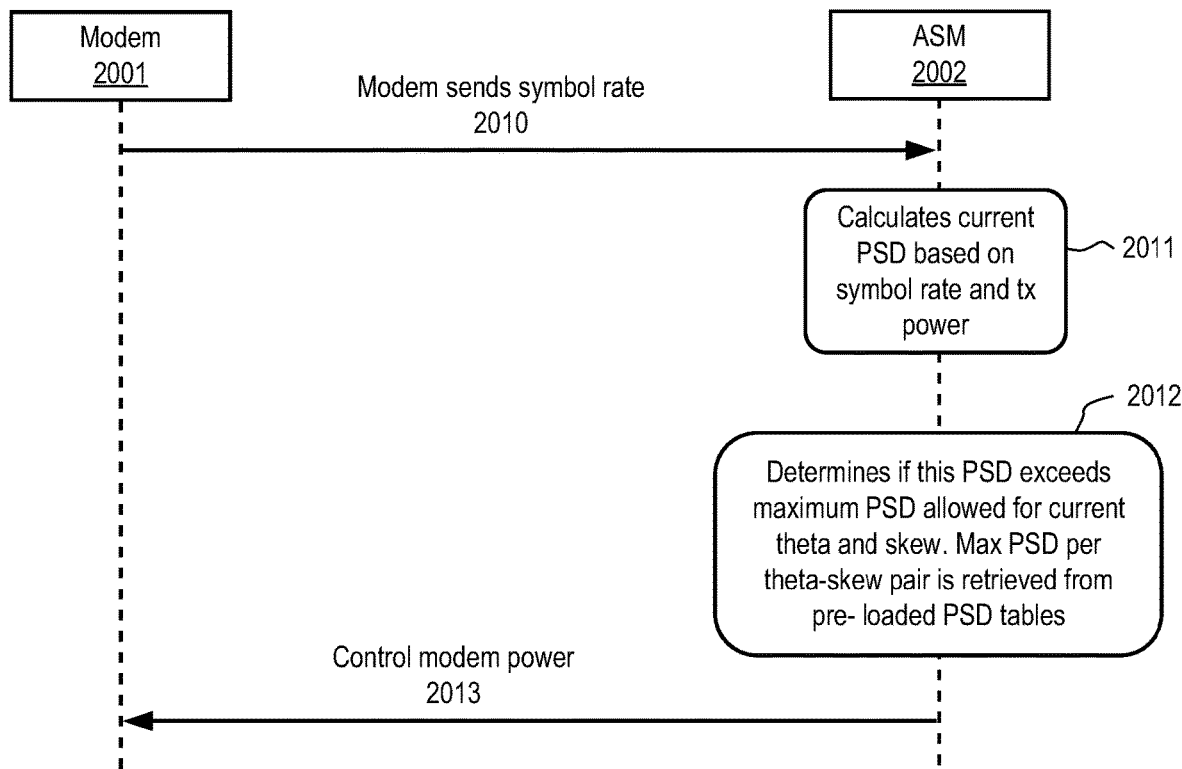
FIG. 20 is a flow diagram of one embodiment of a UPC process that performs modem power control based on theta, skew, and bandwidth.

FIG. 20 is a flow diagram of a UPC process that performs modem power control based on theta, skew, and bandwidth. In one embodiment, the process is performed by processing logic that may comprise hardware (circuitry, dedicated logic, etc.), software (e.g., software running on a chip), firmware, or a combination of the three. Referring to FIG. 20, modem 2001 sends the symbol rate 2010 to ASM 2002. In response to symbol rate 2010, ASM 2002 calculates the current PSD based on the symbol rate and transmit power (processing block 2011). In one embodiment, the transmit power is derived from a BUC that receives the modem output power. In another embodiment, the transmit power is proved by modem 2001. ASM 2002 also determines whether to mute or unmute modem 2001 by comparing the calculated current PSD value with the maximum PSD allowed for the current theta and skew (processing block 2012). In one embodiment, the maximum PSD value per theta and skew pair is retrieved from the preloaded PSD tables. Based on the result of the determination of whether to mute or unmute modem 2001, ASM 2002 sends a command to control power (2013) to modem 2001. In one embodiment, this command may instruct the modem to increase or decrease its output power.

In one embodiment, per-terminal PSD thresholds, both minimum and maximum, are used. This allows for a muting based solution and is advantageous over the implementations that have a single PSD limit value set at installation time where that value is the same for all terminals.

Figure 21:
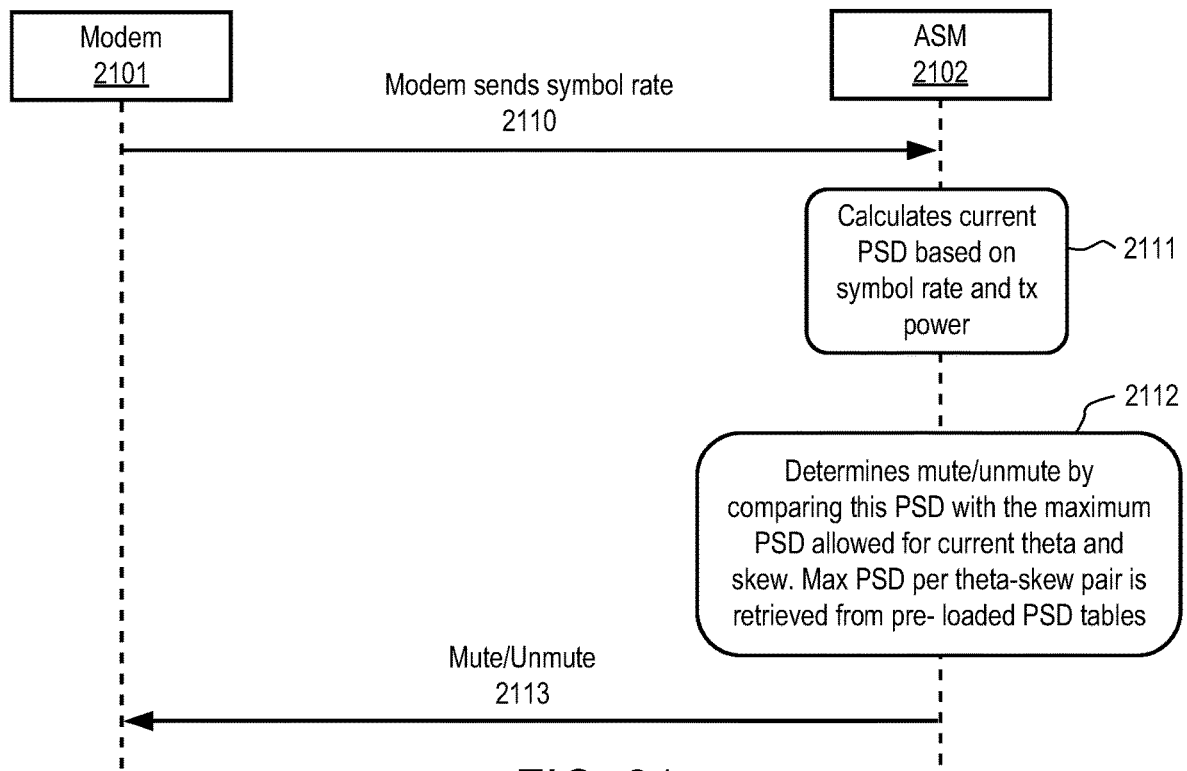
FIG. 21 is a flow diagram of one embodiment of a UPC process that controls a mute operation based on PSD thresholds.

FIG. 21 is a flow diagram of a UPC process that controls a mute operation based on PSD thresholds. In one embodiment, the process is performed by processing logic that may comprise hardware (circuitry, dedicated logic, etc.), software (e.g., software running on a chip), firmware, or a combination of the three. Referring to FIG. 21, modem 2101 sends the symbol rate 2110 to ASM 2102. In response to symbol rate 2110, ASM 2102 calculates the current PSD based on the symbol rate and transmit power (processing block 2111). In one embodiment, the transmit power is derived from a BUC that receives the modem output power. In another embodiment, the transmit power is proved by modem 2101. ASM 2102 also determines whether to mute or unmute modem 2101 by comparing the calculated current PSD value with the maximum PSD allowed for the current theta and skew (processing block 2112). In one embodiment, the maximum PSD value per theta and skew pair is retrieved from the preloaded PSD tables. Based on the result of the determination of whether to mute or unmute modem 2101, ASM 2102 sends a command 2113 telling the modem 2101 to mute or unmute its output power.

In one embodiment, instead of using a PSD limit determined from a set table (per terminal type), the PSD limit is defined by the network operator on a per-terminal basis. In one embodiment, this is used as a muting threshold. To achieve this, the worst-case symbol rate and worst-case power can be entered into the ASM. This can be used to calculate worst-case PSD. From there, the worst-case PSD can be compared with the current PSD limit to determine if the ASM should mute or not. In an alternative embodiment, the worst-case symbol rate is entered but the current output power at run time is obtained from either the modem, BUC, or external sensor. This is advantageous as it allows the use of higher power in areas where the network operator determines that this is possible.

Figure 22:
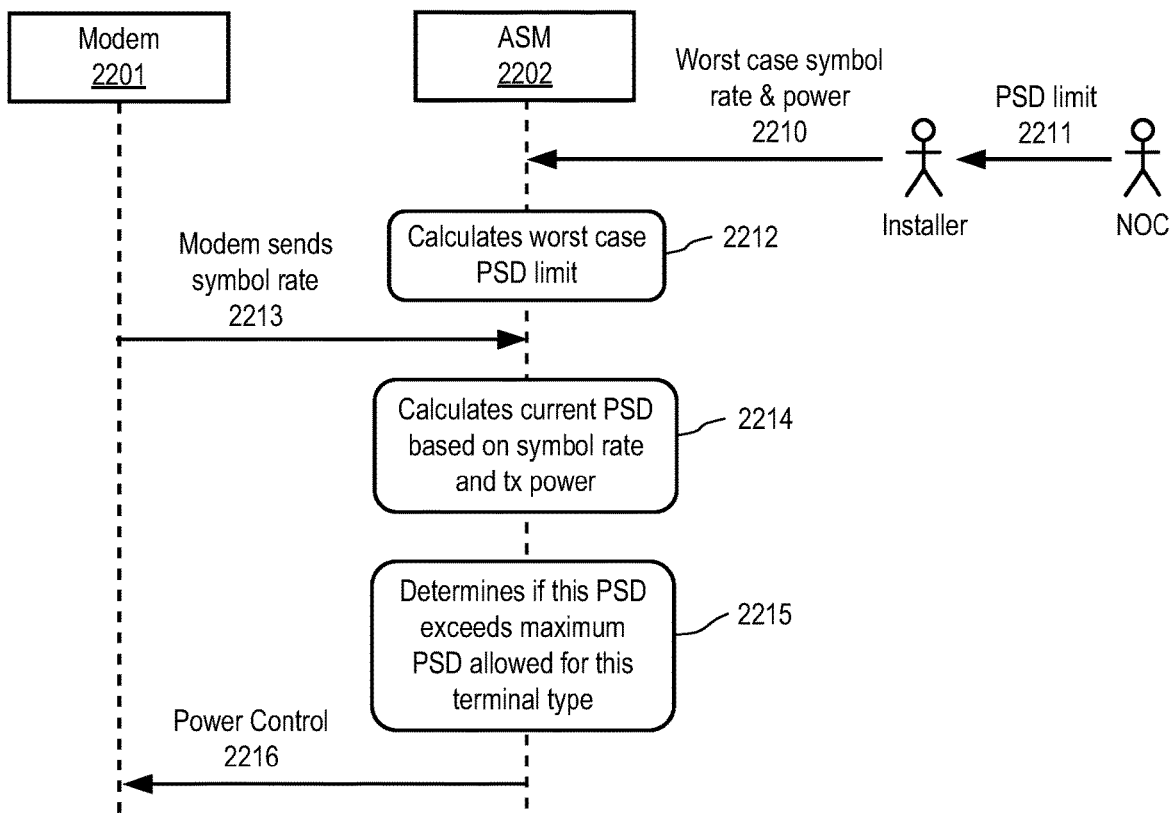
FIG. 22 is a flow diagram of a UPC process that uses worst-case values.

FIG. 22 is a flow diagram of a UPC process that uses worst-case values as describe above. In one embodiment, the process is performed by processing logic that may comprise hardware (circuitry, dedicated logic, etc.), software (e.g., software running on a chip), firmware, or a combination of the three. Referring to FIG. 22, ASM 2202 receives a worst-case symbol rate and power 2210 from an installer that provides the information based on the PSD limit 2211 received from a NOC. Using the worst-case symbol rate and power, ASM 2202 calculates the worst-case PSD limit (processing 2212). ASM 2202 obtains symbol rate 2213 from modem 2201. Using the calculated worst case PSD limit 2212 and symbol rate 2213, processing logic in ASM 2202 calculates the current PSD based on symbol rate and transmit power (processing block 2214). In one embodiment, the transmit power is derived from a BUC that receives the modem output power. In another embodiment, the transmit power is proved by modem 2201. Based on the calculated result, processing logic in the ASM 2202 determines if the calculated PSD exceeds the maximum PSD allowed for this terminal type (processing block 2215). Based on the results of the comparison, ASM 2202 performs power control on modem 2201 using a command 2216.

In one embodiment, the antenna uses a database of maximum PSD values to control modem output power to ensure that the antenna remains with the PSD limit. In one embodiment, this database has a per satellite or per beam worst-case symbol rate. In one embodiment, the database is entered by the user via graphical user interface (GUI) or script, and/or is automatically updated via over-the-air (OTA) service. This is advantageous as it allows the use of higher power in areas where the runtime dynamic worst-case is better than the static global worst-case.

Figure 23:
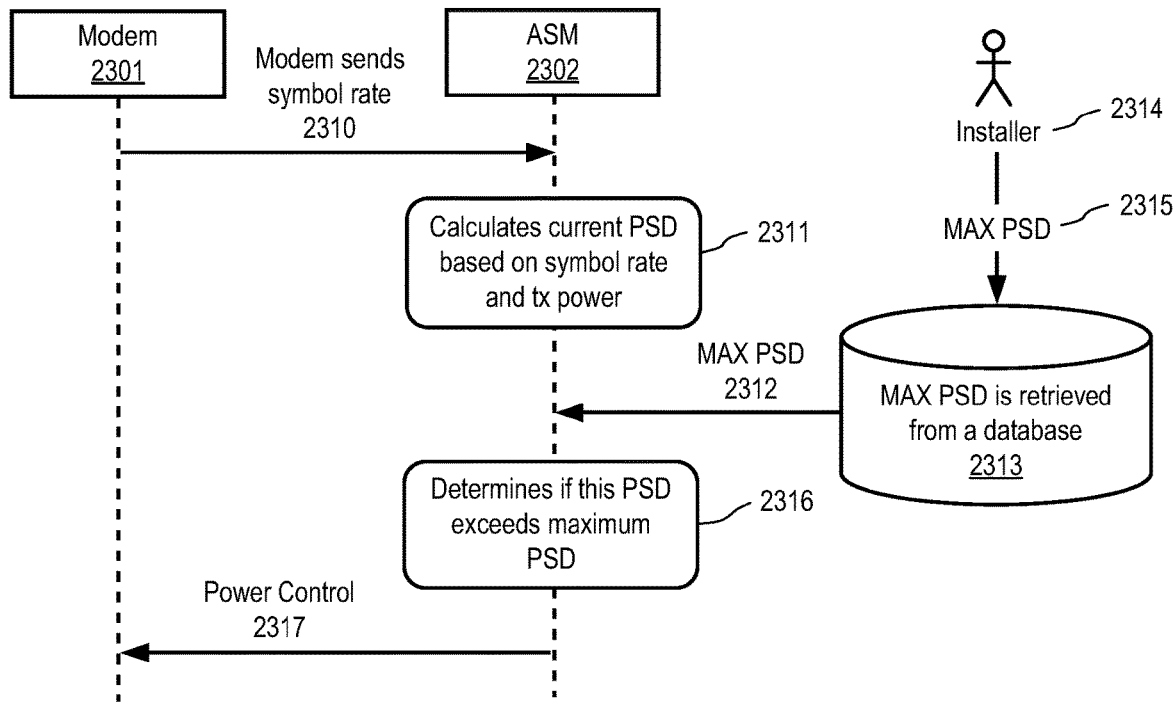
FIG. 23 is a flow diagram of a UPC process that uses database of PSD maximum values.

FIG. 23 is a flow diagram of a UPC process that uses database of PSD maximum values. In one embodiment, the process is performed by processing logic that may comprise hardware (circuitry, dedicated logic, etc.), software (e.g., software running on a chip), firmware, or a combination of the three. Referring to FIG. 23, modem 2301 sends the symbol rate 2310 to ASM 2302. In response thereto, ASM 2302 calculates the current PSD based on the symbol rate and transmit power (processing block 2311). In one embodiment, the transmit power is derived from a BUC that receives the modem output power. In another embodiment, the transmit power is proved by modem 2301. ASM 2302 also receives the maximum PSD value 2312 from database 2313. In one embodiment, the maximum PSD values in database 2313 are received as maximum PSD 2315 from an installer 2314. Using the calculated current PSD value and the maximum PSD value 2312, processing logic in ASM 2302 determines if the current PSD exceeds the maximum PSD (processing block 2316) and performs power control by sending a power control command 2317 to modem 2301.

In one embodiment, by collecting metrics over time from the terminals (e.g., metrics for ASM, modem, BUC, etc.) and the hub, an analysis of historical data can be performed to determine better power limits for a terminal. In one embodiment, the ASM retrieves the latest limits via an over-the-air (OTA) service, and these limits can be used for muting thresholds. In one embodiment, other UPC methods are used during the initial data collection. This includes leveraging data collection from other networks. This is advantageous as it provides a continually optimizing solution instead of a static solution.

Figure 24:
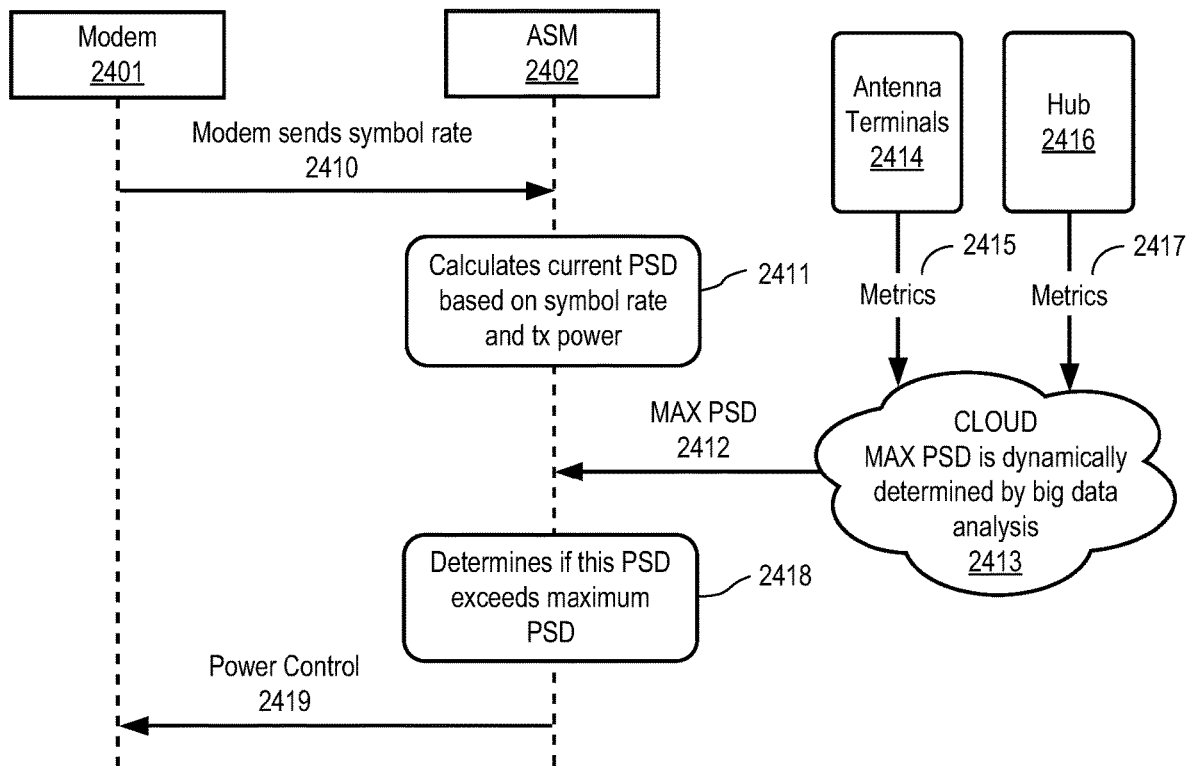
FIG. 24 is a flow diagram of a UPC process that is optimized using data analysis.

FIG. 24 is a flow diagram of a UPC process that is optimized using data analysis. In one embodiment, the process is performed by processing logic that may comprise hardware (circuitry, dedicated logic, etc.), software (e.g., software running on a chip), firmware, or a combination of the three. Referring to FIG. 24, modem 2401 sends symbol ate 2410 to ASM 2402. In response thereto, ASM 2402 calculates the current PSD based on the symbol rate and transmit power (processing block 2411). In one embodiment, the transmit power is derived from a BUC that receives the modem output power. In another embodiment, the transmit power is proved by modem 2401. ASM 2402 also receives the maximum PSD value 2412 from a database accessible via cloud 2413 ASM 2402 receives maximum PSD value 2412 from a cloud-based location 2413. The cloud base location performs big data analysis to determine the maximum PSD dynamically using metrics 2415 corresponding to antenna terminals 2414 and metrics 2417 corresponding to hub 2416. Using the calculated current PSD value and the maximum PSD value 2412, processing logic in ASM 2402 determines if the current PSD exceeds the maximum PSD (processing block 2418) and performs power control by sending a power control command 2419 to modem 2401.

Note that features of several of the above-describe UPC processes are combined. Thus, a number of methods are disclosed that can allow higher power output from the antenna or operation in regions where operation would have been prevented previously when used with a non-parabolic antenna.

Examples of Antenna Embodiments

The techniques described above may be used with flat panel antennas. Embodiments of such flat panel antennas are disclosed. The flat panel antennas include one or more arrays of antenna elements on an antenna aperture. In one embodiment, the antenna elements comprise liquid crystal cells. In one embodiment, the flat panel antenna is a cylindrically fed antenna that includes matrix drive circuitry to uniquely address and drive each of the antenna elements that are not placed in rows and columns. In one embodiment, the elements are placed in rings.

In one embodiment, the antenna aperture having the one or more arrays of antenna elements is comprised of multiple segments coupled together. When coupled together, the combination of the segments form closed concentric rings of antenna elements. In one embodiment, the concentric rings are concentric with respect to the antenna feed.

Examples of Antenna Systems

In one embodiment, the flat panel antenna is part of a metamaterial antenna system. Embodiments of a metamaterial antenna system for communications satellite earth stations are described. In one embodiment, the antenna system is a component or subsystem of a satellite earth station (ES) operating on a mobile platform (e.g., aeronautical, maritime, land, etc.) that operates using either Ka-band frequencies or Ku-band frequencies for civil commercial satellite communications. Note that embodiments of the antenna system also can be used in earth stations that are not on mobile platforms (e.g., fixed or transportable earth stations).

In one embodiment, the antenna system uses surface scattering metamaterial technology (e.g., antenna elements) to form and steer transmit and receive beams through separate antennas. In one embodiment, the antenna systems are analog systems, in contrast to antenna systems that employ digital signal processing to electrically form and steer beams (such as phased array antennas).

In one embodiment, the antenna system is comprised of three functional subsystems: (1) a wave guiding structure consisting of a cylindrical wave feed architecture; (2) an array of wave scattering metamaterial unit cells that are part of antenna elements; and (3) a control structure to command formation of an adjustable radiation field (beam) from the metamaterial scattering elements using holographic principles.

Antenna Elements

Figure 25:
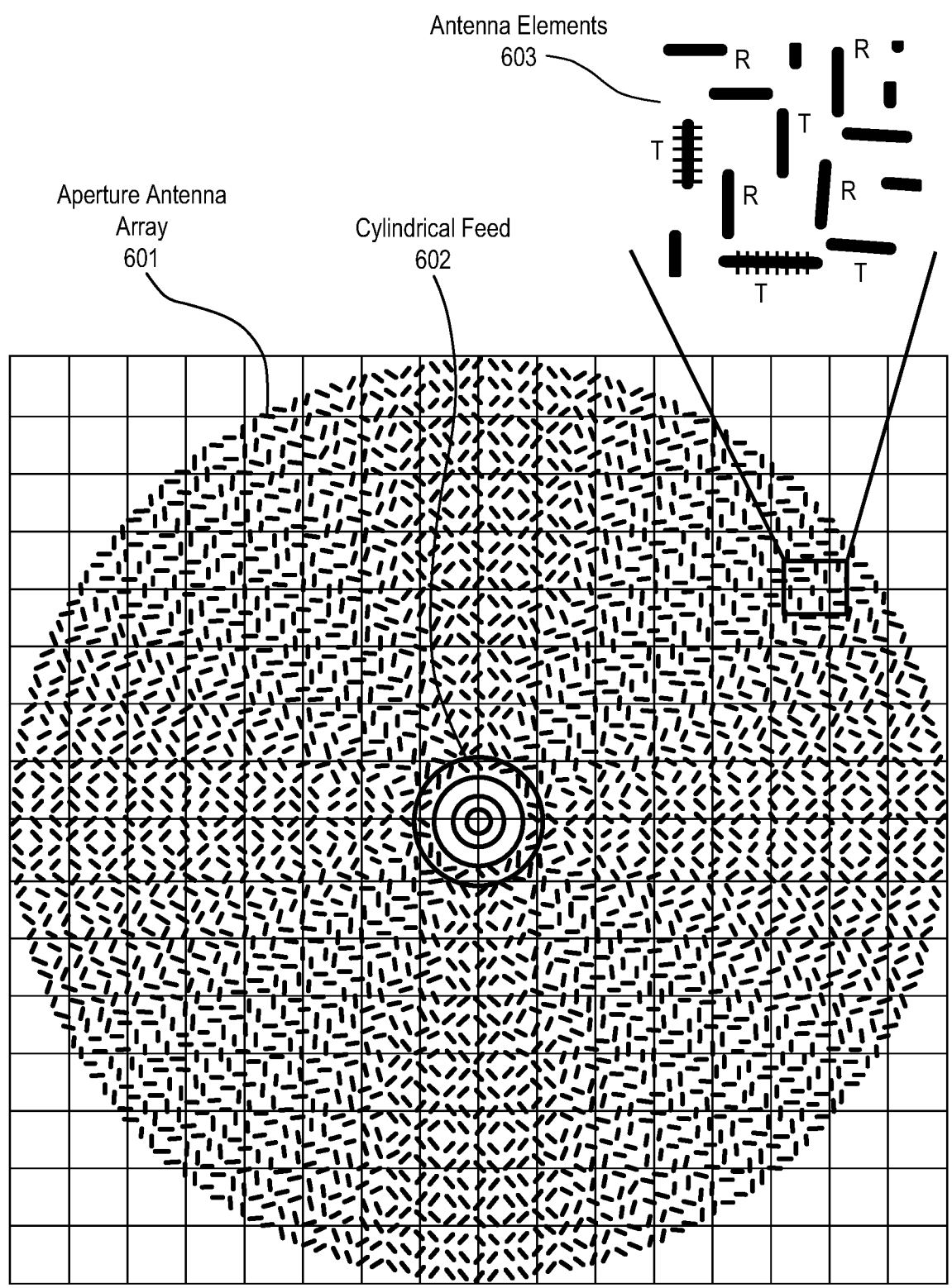
FIG. 25 illustrates the schematic of one embodiment of a cylindrically fed holographic radial aperture antenna.

FIG. 25 illustrates the schematic of one embodiment of a cylindrically fed holographic radial aperture antenna. Referring to FIG. 25, the antenna aperture has one or more arrays 601 of antenna elements 603 that are placed in concentric rings around an input feed 602 of the cylindrically fed antenna. In one embodiment, antenna elements 603 are radio frequency (RF) resonators that radiate RF energy. In one embodiment, antenna elements 603 comprise both Rx and Tx irises that are interleaved and distributed on the whole surface of the antenna aperture. Examples of such antenna elements are described in greater detail below. Note that the RF resonators described herein may be used in antennas that do not include a cylindrical feed.

In one embodiment, the antenna includes a coaxial feed that is used to provide a cylindrical wave feed via input feed 602. In one embodiment, the cylindrical wave feed architecture feeds the antenna from a central point with an excitation that spreads outward in a cylindrical manner from the feed point. That is, a cylindrically fed antenna creates an outward travelling concentric feed wave. Even so, the shape of the cylindrical feed antenna around the cylindrical feed can be circular, square or any shape. In another embodiment, a cylindrically fed antenna creates an inward travelling feed wave. In such a case, the feed wave most naturally comes from a circular structure.

In one embodiment, antenna elements 603 comprise irises and the aperture antenna of FIG. 25 is used to generate a main beam shaped by using excitation from a cylindrical feed wave for radiating irises through tunable liquid crystal (LC) material. In one embodiment, the antenna can be excited to radiate a horizontally or vertically polarized electric field at desired scan angles.

In one embodiment, the antenna elements comprise a group of patch antennas. This group of patch antennas comprises an array of scattering metamaterial elements. In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor. As would be understood by those skilled in the art, LC in the context of CELC refers to inductance-capacitance, as opposed to liquid crystal.

In one embodiment, a liquid crystal (LC) is disposed in the gap around the scattering element. This LC is driven by the direct drive embodiments described above. In one embodiment, liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, in one embodiment, the liquid crystal integrates an on/off switch for the transmission of energy from the guided wave to the CELC. When switched on, the CELC emits an electromagnetic wave like an electrically small dipole antenna. Note that the teachings herein are not limited to having a liquid crystal that operates in a binary fashion with respect to energy transmission.

In one embodiment, the feed geometry of this antenna system allows the antenna elements to be positioned at forty-five-degree (45°) angles to the vector of the wave in the wave feed. Note that other positions may be used (e.g., at 40° angles). This position of the elements enables control of the free space wave received by or transmitted/radiated from the elements. In one embodiment, the antenna elements are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the two sets of elements are perpendicular to each other and simultaneously have equal amplitude excitation if controlled to the same tuning state. Rotating them +/−45 degrees relative to the feed wave excitation achieves both desired features at once. Rotating one set 0 degrees and the other 90 degrees would achieve the perpendicular goal, but not the equal amplitude excitation goal. Note that 0 and 90 degrees may be used to achieve isolation when feeding the array of antenna elements in a single structure from two sides.

The amount of radiated power from each unit cell is controlled by applying a voltage to the patch (potential across the LC channel) using a controller. Traces to each patch are used to provide the voltage to the patch antenna. The voltage is used to tune or detune the capacitance and thus the resonance frequency of individual elements to effectuate beam forming. The voltage required is dependent on the liquid crystal mixture being used. The voltage tuning characteristic of liquid crystal mixtures is mainly described by a threshold voltage at which the liquid crystal starts to be affected by the voltage and the saturation voltage, above which an increase of the voltage does not cause major tuning in liquid crystal. These two characteristic parameters can change for different liquid crystal mixtures.

In one embodiment, as discussed above, a matrix drive is used to apply voltage to the patches in order to drive each cell separately from all the other cells without having a separate connection for each cell (direct drive). Because of the high density of elements, the matrix drive is an efficient way to address each cell individually.

In one embodiment, the control structure for the antenna system has 2 main components: the antenna array controller, which includes drive electronics, for the antenna system, is below the wave scattering structure, while the matrix drive switching array is interspersed throughout the radiating RF array in such a way as to not interfere with the radiation. In one embodiment, the drive electronics for the antenna system comprise commercial off-the shelf LCD controls used in commercial television appliances that adjust the bias voltage for each scattering element by adjusting the amplitude or duty cycle of an AC bias signal to that element.

In one embodiment, the antenna array controller also contains a microprocessor executing the software. The control structure may also incorporate sensors (e.g., a GPS receiver, a three-axis compass, a 3-axis accelerometer, 3-axis gyro, 3-axis magnetometer, etc.) to provide location and orientation information to the processor. The location and orientation information may be provided to the processor by other systems in the earth station and/or may not be part of the antenna system.

More specifically, the antenna array controller controls which elements are turned off and those elements turned on and at which phase and amplitude level at the frequency of operation. The elements are selectively detuned for frequency operation by voltage application.

For transmission, a controller supplies an array of voltage signals to the RF patches to create a modulation, or control pattern. The control pattern causes the elements to be turned to different states. In one embodiment, multistate control is used in which various elements are turned on and off to varying levels, further approximating a sinusoidal control pattern, as opposed to a square wave (i.e., a sinusoid gray shade modulation pattern). In one embodiment, some elements radiate more strongly than others, rather than some elements radiate and some do not. Variable radiation is achieved by applying specific voltage levels, which adjusts the liquid crystal permittivity to varying amounts, thereby detuning elements variably and causing some elements to radiate more than others.

The generation of a focused beam by the metamaterial array of elements can be explained by the phenomenon of constructive and destructive interference. Individual electromagnetic waves sum up (constructive interference) if they have the same phase when they meet in free space and waves cancel each other (destructive interference) if they are in opposite phase when they meet in free space. If the slots in a slotted antenna are positioned so that each successive slot is positioned at a different distance from the excitation point of the guided wave, the scattered wave from that element will have a different phase than the scattered wave of the previous slot. If the slots are spaced one quarter of a guided wavelength apart, each slot will scatter a wave with a one fourth phase delay from the previous slot.

Using the array, the number of patterns of constructive and destructive interference that can be produced can be increased so that beams can be pointed theoretically in any direction plus or minus ninety degrees (90°) from the bore sight of the antenna array, using the principles of holography. Thus, by controlling which metamaterial unit cells are turned on or off (i.e., by changing the pattern of which cells are turned on and which cells are turned off), a different pattern of constructive and destructive interference can be produced, and the antenna can change the direction of the main beam. The time required to turn the unit cells on and off dictates the speed at which the beam can be switched from one location to another location.

In one embodiment, the antenna system produces one steerable beam for the uplink antenna and one steerable beam for the downlink antenna. In one embodiment, the antenna system uses metamaterial technology to receive beams and to decode signals from the satellite and to form transmit beams that are directed toward the satellite. In one embodiment, the antenna systems are analog systems, in contrast to antenna systems that employ digital signal processing to electrically form and steer beams (such as phased array antennas). In one embodiment, the antenna system is considered a "surface" antenna that is planar and relatively low profile, especially when compared to conventional satellite dish receivers.

Figure 26:
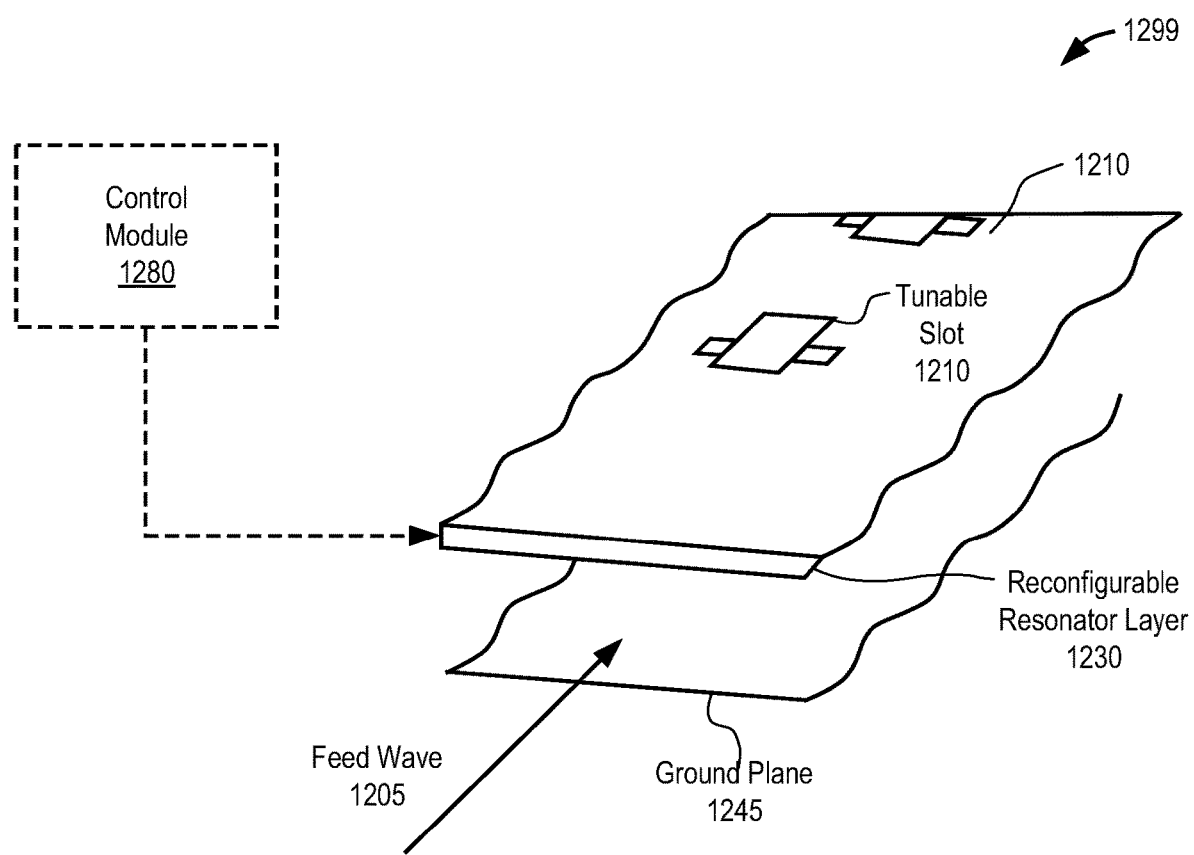
FIG. 26 illustrates a perspective view of one row of antenna elements that includes a ground plane and a reconfigurable resonator layer.

FIG. 26 illustrates a perspective view of one row of antenna elements that includes a ground plane and a reconfigurable resonator layer. Reconfigurable resonator layer 1230 includes an array of tunable slots 1210. The array of tunable slots 1210 can be configured to point the antenna in a desired direction. Each of the tunable slots can be tuned/adjusted by varying a voltage across the liquid crystal.

Figure 27:
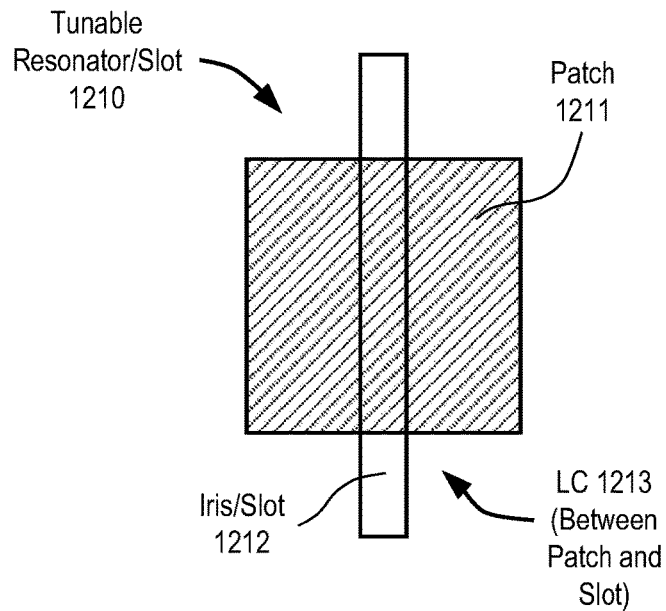
FIG. 27 illustrates one embodiment of a tunable resonator/slot.

Control module 1280 is coupled to reconfigurable resonator layer 1230 to modulate the array of tunable slots 1210 by varying the voltage across the liquid crystal in FIG. 27. Control module 1280 may include a Field Programmable Gate Array ("FPGA"), a microprocessor, a controller, System-on-a-Chip (SoC), or other processing logic. In one embodiment, control module 1280 includes logic circuitry (e.g., multiplexer) to drive the array of tunable slots 1210. In one embodiment, control module 1280 receives data that includes specifications for a holographic diffraction pattern to be driven onto the array of tunable slots 1210. The holographic diffraction patterns may be generated in response to a spatial relationship between the antenna and a satellite so that the holographic diffraction pattern steers the downlink beams (and uplink beam if the antenna system performs transmit) in the appropriate direction for communication. Although not drawn in each figure, a control module similar to control module 1280 may drive each array of tunable slots described in the figures of the disclosure.

Radio Frequency ("RF") holography is also possible using analogous techniques where a desired RF beam can be generated when an RF reference beam encounters an RF holographic diffraction pattern. In the case of satellite communications, the reference beam is in the form of a feed wave, such as feed wave 1205 (approximately 20 GHz in some embodiments). To transform a feed wave into a radiated beam (either for transmitting or receiving purposes), an interference pattern is calculated between the desired RF beam (the object beam) and the feed wave (the reference beam). The interference pattern is driven onto the array of tunable slots 1210 as a diffraction pattern so that the feed wave is "steered" into the desired RF beam (having the desired shape and direction). In other words, the feed wave encountering the holographic diffraction pattern "reconstructs" the object beam, which is formed according to design requirements of the communication system. The holographic diffraction pattern contains the excitation of each element and is calculated by $w_{hologram}=w_{in}*w_{out}$, with $w_{in}$ as the wave equation in the waveguide and $w_{out}$ the wave equation on the outgoing wave.

FIG. 27 illustrates one embodiment of a tunable resonator/slot 1210. Tunable slot 1210 includes an iris/slot 1212, a radiating patch 1211, and liquid crystal 1213 disposed between iris 1212 and patch 1211. In one embodiment, radiating patch 1211 is co-located with iris 1212.

Figure 28:
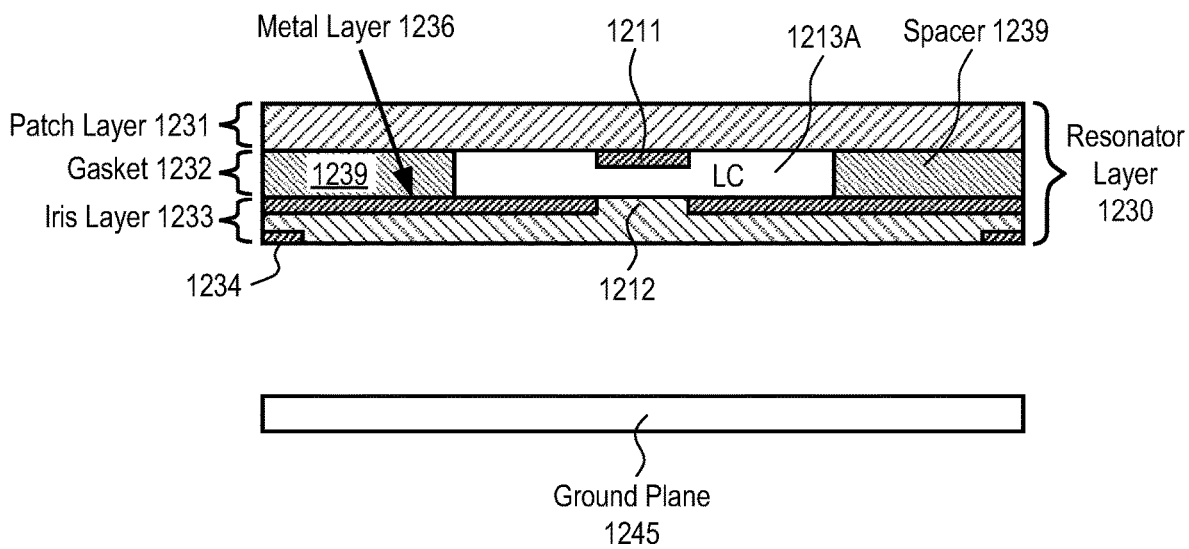
FIG. 28 illustrates a cross section view of one embodiment of a physical antenna aperture.

FIG. 28 illustrates a cross section view of one embodiment of a physical antenna aperture. The antenna aperture includes ground plane 1245, and a metal layer 1236 within iris layer 1233, which is included in reconfigurable resonator layer 1230. In one embodiment, the antenna aperture of FIG. 28 includes a plurality of tunable resonator/slots 1210 of FIG. 27. Iris/slot 1212 is defined by openings in metal layer 1236. A feed wave, such as feed wave 1205 of FIG. 26, may have a microwave frequency compatible with satellite communication channels. The feed wave propagates between ground plane 1245 and resonator layer 1230.

Reconfigurable resonator layer 1230 also includes gasket layer 1232 and patch layer 1231. Gasket layer 1232 is disposed between patch layer 1231 and iris layer 1233. Note that in one embodiment, a spacer could replace gasket layer 1232. In one embodiment, iris layer 1233 is a printed circuit board ("PCB") that includes a copper layer as metal layer 1236. In one embodiment, iris layer 1233 is glass. Iris layer 1233 may be other types of substrates.

Openings may be etched in the copper layer to form slots 1212. In one embodiment, iris layer 1233 is conductively coupled by a conductive bonding layer to another structure (e.g., a waveguide) in FIG. 28. Note that in an embodiment the iris layer is not conductively coupled by a conductive bonding layer and is instead interfaced with a non-conducting bonding layer.

Patch layer 1231 may also be a PCB that includes metal as radiating patches 1211. In one embodiment, gasket layer 1232 includes spacers 1239 that provide a mechanical standoff to define the dimension between metal layer 1236 and patch 1211. In one embodiment, the spacers are 75 microns, but other sizes may be used (e.g., 3-200 mm). As mentioned above, in one embodiment, the antenna aperture of FIG. 26 includes multiple tunable resonator/slots, such as tunable resonator/slot 1210 includes patch 1211, liquid crystal 1213, and iris 1212 of FIG. 27. The chamber for liquid crystal 1213 is defined by spacers 1239, iris layer 1233 and metal layer 1236. When the chamber is filled with liquid crystal, patch layer 1231 can be laminated onto spacers 1239 to seal liquid crystal within resonator layer 1230.

A voltage between patch layer 1231 and iris layer 1233 can be modulated to tune the liquid crystal in the gap between the patch and the slots (e.g., tunable resonator/slot 1210). Adjusting the voltage across liquid crystal 1213 varies the capacitance of a slot (e.g., tunable resonator/slot 1210). Accordingly, the reactance of a slot (e.g., tunable resonator/slot 1210) can be varied by changing the capacitance. Resonant frequency of slot 1210 also changes according to the equation $$f = \frac{1}{2\pi\sqrt{LC}}$$

where f is the resonant frequency of slot 1210 and L and C are the inductance and capacitance of slot 1210, respectively. The resonant frequency of slot 1210 affects the energy radiated from feed wave 1205 propagating through the waveguide. As an example, if feed wave 1205 is 20 GHz, the resonant frequency of a slot 1210 may be adjusted (by varying the capacitance) to 17 GHz so that the slot 1210 couples substantially no energy from feed wave 1205. Or, the resonant frequency of a slot 1210 may be adjusted to 20 GHz so that the slot 1210 couples energy from feed wave 1205 and radiates that energy into free space. Although the examples given are binary (fully radiating or not radiating at all), full gray scale control of the reactance, and therefore the resonant frequency of slot 1210 is possible with voltage variance over a multi-valued range. Hence, the energy radiated from each slot 1210 can be finely controlled so that detailed holographic diffraction patterns can be formed by the array of tunable slots.

In one embodiment, tunable slots in a row are spaced from each other by $\lambda/5$. Other spacings may be used. In one embodiment, each tunable slot in a row is spaced from the closest tunable slot in an adjacent row by $\lambda/2$, and, thus, commonly oriented tunable slots in different rows are spaced by $\lambda/4$, though other spacings are possible (e.g., $\lambda/5$, $\lambda/6.3$). In another embodiment, each tunable slot in a row is spaced from the closest tunable slot in an adjacent row by $\lambda/3$.

Embodiments use reconfigurable metamaterial technology, such as described in U.S. patent application Ser. No. 14/550,178, entitled "Dynamic Polarization and Coupling Control from a Steerable Cylindrically Fed Holographic Antenna", filed Nov. 21, 2014 and U.S. patent application Ser. No. 14/610,502, entitled "Ridged Waveguide Feed Structures for Reconfigurable Antenna", filed Jan. 30, 2015.

FIGS. 29A-D illustrate one embodiment of the different layers for creating the slotted array. The antenna array includes antenna elements that are positioned in rings, such as the example rings shown in FIG. 29A. Note that in this example the antenna array has two different types of antenna elements that are used for two different types of frequency bands.

Figure 29A:
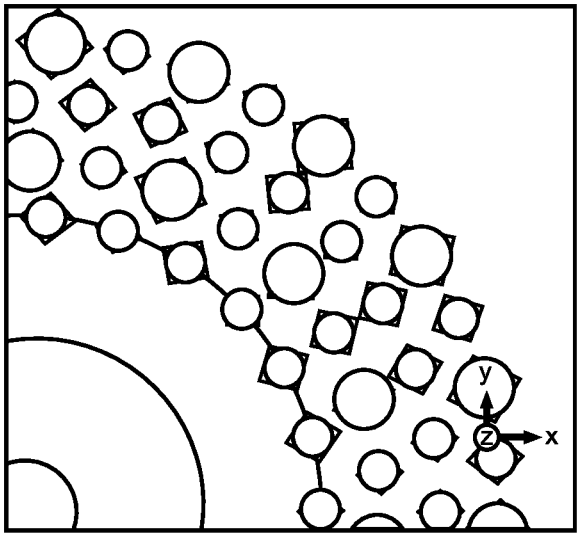
FIG. 29A-D illustrate one embodiment of the different layers for creating the slotted array.
Figure 29B:
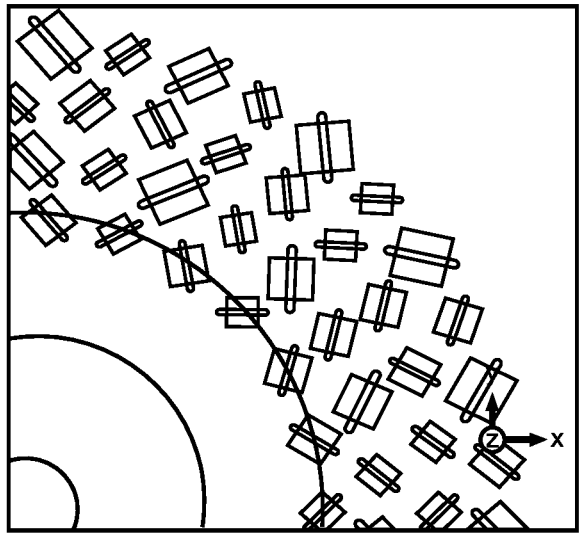
Figure 29C:
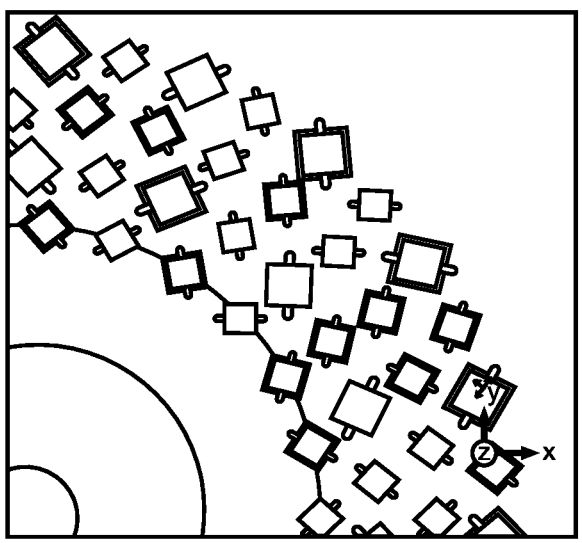
Figure 29D:
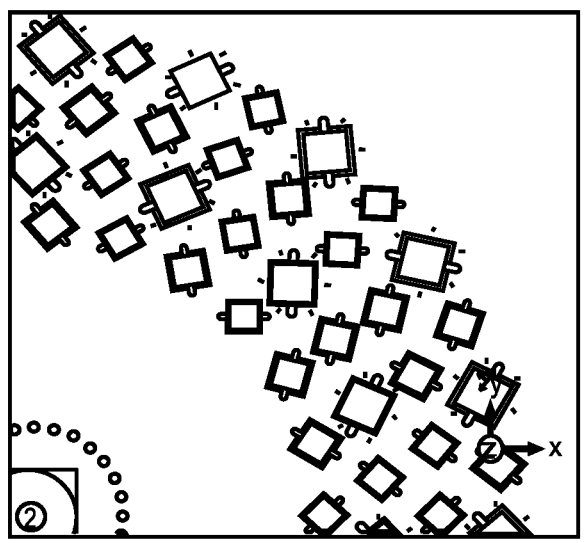

FIG. 29A illustrates a portion of the first iris board layer with locations corresponding to the slots. Referring to FIG. 29A, the circles are open areas/slots in the metallization in the bottom side of the iris substrate, and are for controlling the coupling of elements to the feed (the feed wave). Note that this layer is an optional layer and is not used in all designs. FIG. 29B illustrates a portion of the second iris board layer containing slots. FIG. 29C illustrates patches over a portion of the second iris board layer. FIG. 29D illustrates a top view of a portion of the slotted array.

Figure 30:
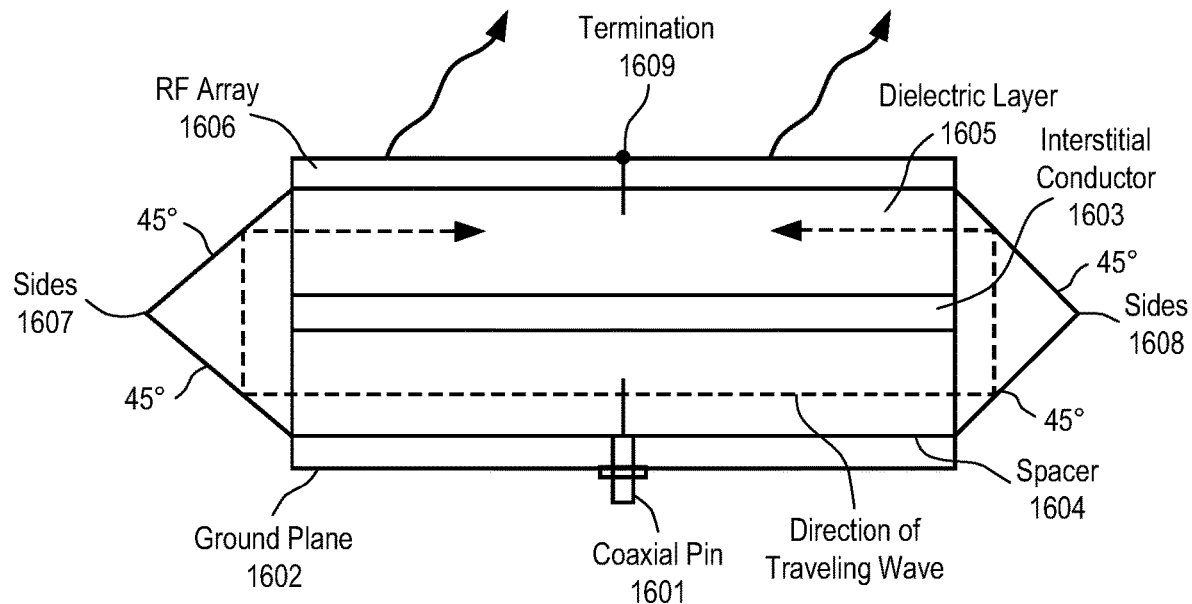
FIG. 30 illustrates a side view of one embodiment of a cylindrically fed antenna structure.

FIG. 30 illustrates a side view of one embodiment of a cylindrically fed antenna structure. The antenna produces an inwardly travelling wave using a double layer feed structure (i.e., two layers of a feed structure). In one embodiment, the antenna includes a circular outer shape, though this is not required. That is, non-circular inward travelling structures can be used. In one embodiment, the antenna structure in FIG. 30 includes a coaxial feed, such as, for example, described in U.S. Publication No. 2015/0236412, entitled "Dynamic Polarization and Coupling Control from a Steerable Cylindrically Fed Holographic Antenna", filed on Nov. 21, 2014.

Referring to FIG. 30, a coaxial pin 1601 is used to excite the field on the lower level of the antenna. In one embodiment, coaxial pin 1601 is a 50Ω coax pin that is readily available. Coaxial pin 1601 is coupled (e.g., bolted) to the bottom of the antenna structure, which is conducting ground plane 1602. Separate from conducting ground plane 1602 is interstitial conductor 1603, which is an internal conductor. In one embodiment, conducting ground plane 1602 and interstitial conductor 1603 are parallel to each other. In one embodiment, the distance between ground plane 1602 and interstitial conductor 1603 is 0.1-0.15". In another embodiment, this distance may be $\lambda/2$, where $\lambda$ is the wavelength of the travelling wave at the frequency of operation.

Ground plane 1602 is separated from interstitial conductor 1603 via a spacer 1604. In one embodiment, spacer 1604 is a foam or air-like spacer. In one embodiment, spacer 1604 comprises a plastic spacer.

On top of interstitial conductor 1603 is dielectric layer 1605. In one embodiment, dielectric layer 1605 is plastic. The purpose of dielectric layer 1605 is to slow the travelling wave relative to free space velocity. In one embodiment, dielectric layer 1605 slows the travelling wave by 30% relative to free space. In one embodiment, the range of indices of refraction that are suitable for beam forming are 1.2-1.8, where free space has by definition an index of refraction equal to 1. Other dielectric spacer materials, such as, for example, plastic, may be used to achieve this effect. Note that materials other than plastic may be used as long as they achieve the desired wave slowing effect. Alternatively, a material with distributed structures may be used as dielectric 1605, such as periodic sub-wavelength metallic structures that can be machined or lithographically defined, for example.

An RF-array 1606 is on top of dielectric 1605. In one embodiment, the distance between interstitial conductor 1603 and RF-array 1606 is 0.1-0.15". In another embodiment, this distance may be $\lambda_{eff}/2$, where $\lambda_{eff}$ is the effective wavelength in the medium at the design frequency.

The antenna includes sides 1607 and 1608. Sides 1607 and 1608 are angled to cause a travelling wave feed from coax pin 1601 to be propagated from the area below interstitial conductor 1603 (the spacer layer) to the area above interstitial conductor 1603 (the dielectric layer) via reflection. In one embodiment, the angle of sides 1607 and 1608 are at 45° angles. In an alternative embodiment, sides 1607 and 1608 could be replaced with a continuous radius to achieve the reflection. While FIG. 30 shows angled sides that have angle of 45 degrees, other angles that accomplish signal transmission from lower level feed to upper level feed may be used. That is, given that the effective wavelength in the lower feed will generally be different than in the upper feed, some deviation from the ideal 45° angles could be used to aid transmission from the lower to the upper feed level. For example, in another embodiment, the 45° angles are replaced with a single step. The steps on one end of the antenna go around the dielectric layer, interstitial the conductor, and the spacer layer. The same two steps are at the other ends of these layers.

In operation, when a feed wave is fed in from coaxial pin 1601, the wave travels outward concentrically oriented from coaxial pin 1601 in the area between ground plane 1602 and interstitial conductor 1603. The concentrically outgoing waves are reflected by sides 1607 and 1608 and travel inwardly in the area between interstitial conductor 1603 and RF array 1606. The reflection from the edge of the circular perimeter causes the wave to remain in phase (i.e., it is an in-phase reflection). The travelling wave is slowed by dielectric layer 1605. At this point, the travelling wave starts interacting and exciting with elements in RF array 1606 to obtain the desired scattering.

To terminate the travelling wave, a termination 1609 is included in the antenna at the geometric center of the antenna. In one embodiment, termination 1609 comprises a pin termination (e.g., a 50Ω pin). In another embodiment, termination 1609 comprises an RF absorber that terminates unused energy to prevent reflections of that unused energy back through the feed structure of the antenna. These could be used at the top of RF array 1606.

Figure 31:
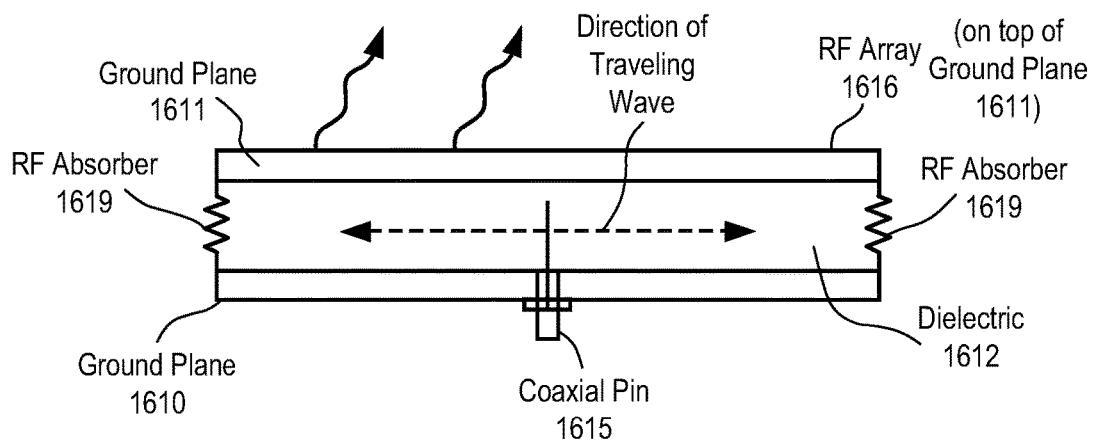
FIG. 31 illustrates another embodiment of the antenna system with an outgoing wave.

FIG. 31 illustrates another embodiment of the antenna system with an outgoing wave. Referring to FIG. 31, two ground planes 1610 and 1611 are substantially parallel to each other with a dielectric layer 1612 (e.g., a plastic layer, etc.) in between ground planes. RF absorbers 1619 (e.g., resistors) couple the two ground planes 1610 and 1611 together. A coaxial pin 1615 (e.g., 50Ω) feeds the antenna. An RF array 1616 is on top of dielectric layer 1612 and ground plane 1611.

In operation, a feed wave is fed through coaxial pin 1615 and travels concentrically outward and interacts with the elements of RF array 1616.

The cylindrical feed in both the antennas of FIGS. 30 and 31 improves the service angle of the antenna. Instead of a service angle of plus or minus forty-five degrees azimuth (±45° Az) and plus or minus twenty-five degrees elevation (±25° El), in one embodiment, the antenna system has a service angle of seventy-five degrees (75°) from the bore sight in all directions. As with any beam forming antenna comprised of many individual radiators, the overall antenna gain is dependent on the gain of the constituent elements, which themselves are angle-dependent. When using common radiating elements, the overall antenna gain typically decreases as the beam is pointed further off bore sight. At 75 degrees off bore sight, significant gain degradation of about 25 dB is expected.

Embodiments of the antenna having a cylindrical feed solve one or more problems. These include dramatically simplifying the feed structure compared to antennas fed with a corporate divider network and therefore reducing total required antenna and antenna feed volume; decreasing sensitivity to manufacturing and control errors by maintaining high beam performance with coarser controls (extending all the way to simple binary control); giving a more advantageous side lobe pattern compared to rectilinear feeds because the cylindrically oriented feed waves result in spatially diverse side lobes in the far field; and allowing polarization to be dynamic, including allowing left-hand circular, right-hand circular, and linear polarizations, while not requiring a polarizer.

Array of Wave Scattering Elements

RF array 1606 of FIG. 30 and RF array 1616 of FIG. 31 include a wave scattering subsystem that includes a group of patch antennas (e.g., scatterers) that act as radiators. This group of patch antennas comprises an array of scattering metamaterial elements.

In one embodiment, each scattering element in the antenna system is part of a unit cell that consists of a lower conductor, a dielectric substrate and an upper conductor that embeds a complementary electric inductive-capacitive resonator ("complementary electric LC" or "CELC") that is etched in or deposited onto the upper conductor.

In one embodiment, a liquid crystal (LC) is injected in the gap around the scattering element. Liquid crystal is encapsulated in each unit cell and separates the lower conductor associated with a slot from an upper conductor associated with its patch. Liquid crystal has a permittivity that is a function of the orientation of the molecules comprising the liquid crystal, and the orientation of the molecules (and thus the permittivity) can be controlled by adjusting the bias voltage across the liquid crystal. Using this property, the liquid crystal acts as an on/off switch for the transmission of energy from the guided wave to the CELC. When switched on, the CELC emits an electromagnetic wave like an electrically small dipole antenna.

Controlling the thickness of the LC increases the beam switching speed. A fifty percent (50%) reduction in the gap between the lower and the upper conductor (the thickness of the liquid crystal) results in a fourfold increase in speed. In another embodiment, the thickness of the liquid crystal results in a beam switching speed of approximately fourteen milliseconds (14 ms). In one embodiment, the LC is doped in a manner well-known in the art to improve responsiveness so that a seven millisecond (7 ms) requirement can be met.

The CELC element is responsive to a magnetic field that is applied parallel to the plane of the CELC element and perpendicular to the CELC gap complement. When a voltage is applied to the liquid crystal in the metamaterial scattering unit cell, the magnetic field component of the guided wave induces a magnetic excitation of the CELC, which, in turn, produces an electromagnetic wave in the same frequency as the guided wave.

The phase of the electromagnetic wave generated by a single CELC can be selected by the position of the CELC on the vector of the guided wave. Each cell generates a wave in phase with the guided wave parallel to the CELC. Because the CELCs are smaller than the wave length, the output wave has the same phase as the phase of the guided wave as it passes beneath the CELC.

In one embodiment, the cylindrical feed geometry of this antenna system allows the CELC elements to be positioned at forty-five-degree (45°) angles to the vector of the wave in the wave feed. This position of the elements enables control of the polarization of the free space wave generated from or received by the elements. In one embodiment, the CELCs are arranged with an inter-element spacing that is less than a free-space wavelength of the operating frequency of the antenna. For example, if there are four scattering elements per wavelength, the elements in the 30 GHz transmit antenna will be approximately 2.5 mm (i.e., ¼th the 10 mm free-space wavelength of 30 GHz).

In one embodiment, the CELCs are implemented with patch antennas that include a patch co-located over a slot with liquid crystal between the two. In this respect, the metamaterial antenna acts like a slotted (scattering) wave guide. With a slotted wave guide, the phase of the output wave depends on the location of the slot in relation to the guided wave.

Cell Placement

Figure 32:
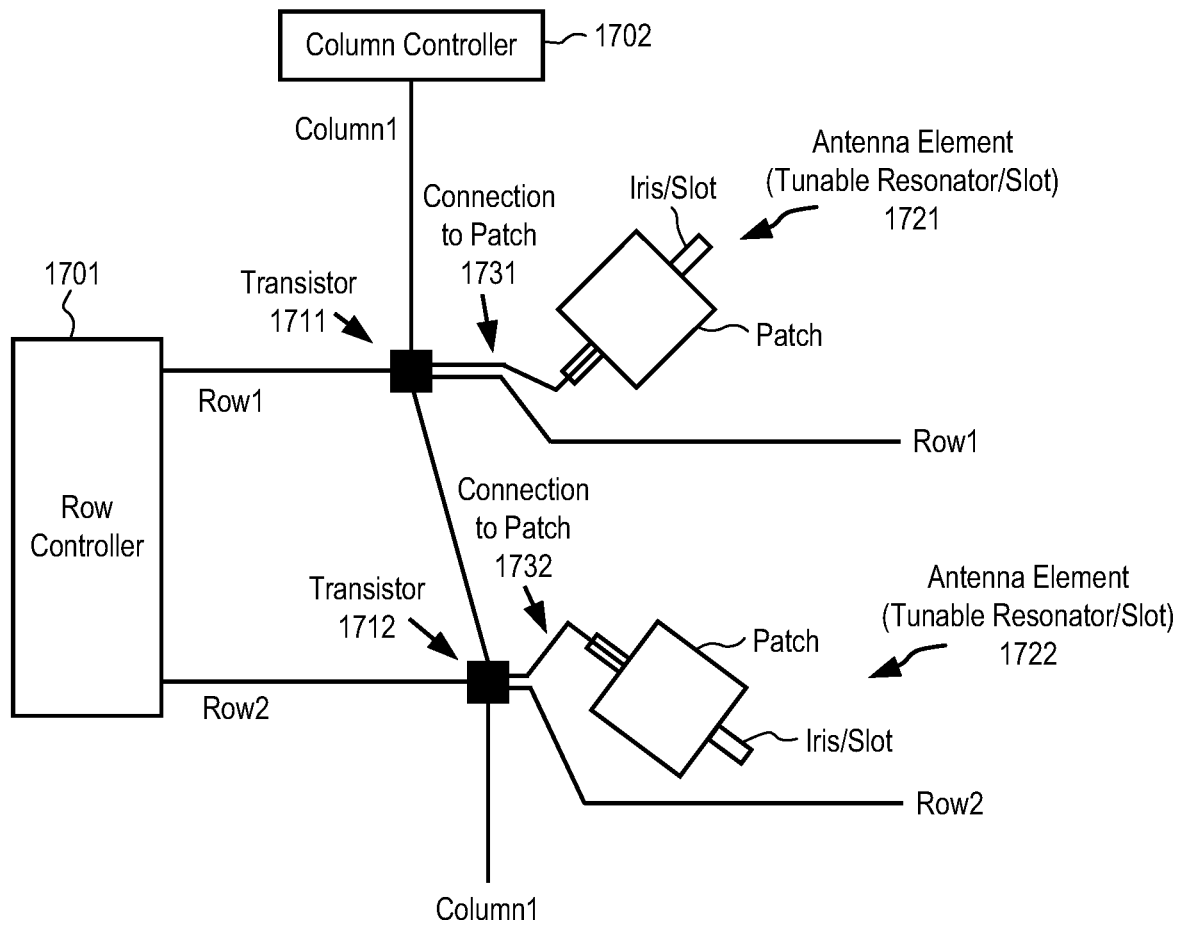
FIG. 32 illustrates one embodiment of the placement of matrix drive circuitry with respect to antenna elements.

In one embodiment, the antenna elements are placed on the cylindrical feed antenna aperture in a way that allows for a systematic matrix drive circuit. The placement of the cells includes placement of the transistors for the matrix drive. FIG. 32 illustrates one embodiment of the placement of matrix drive circuitry with respect to antenna elements. Referring to FIG. 32, row controller 1701 is coupled to transistors 1711 and 1712, via row select signals Row1 and Row2, respectively, and column controller 1702 is coupled to transistors 1711 and 1712 via column select signal Column1. Transistor 1711 is also coupled to antenna element 1721 via connection to patch 1731, while transistor 1712 is coupled to antenna element 1722 via connection to patch 1732.

In an initial approach to realize matrix drive circuitry on the cylindrical feed antenna with unit cells placed in a non-regular grid, two steps are performed. In the first step, the cells are placed on concentric rings and each of the cells is connected to a transistor that is placed beside the cell and acts as a switch to drive each cell separately. In the second step, the matrix drive circuitry is built in order to connect every transistor with a unique address as the matrix drive approach requires. Because the matrix drive circuit is built by row and column traces (similar to LCDs) but the cells are placed on rings, there is no systematic way to assign a unique address to each transistor. This mapping problem results in very complex circuitry to cover all the transistors and leads to a significant increase in the number of physical traces to accomplish the routing. Because of the high density of cells, those traces disturb the RF performance of the antenna due to coupling effect. Also, due to the complexity of traces and high packing density, the routing of the traces cannot be accomplished by commercially available layout tools.

In one embodiment, the matrix drive circuitry is predefined before the cells and transistors are placed. This ensures a minimum number of traces that are necessary to drive all the cells, each with a unique address. This strategy reduces the complexity of the drive circuitry and simplifies the routing, which subsequently improves the RF performance of the antenna.

More specifically, in one approach, in the first step, the cells are placed on a regular rectangular grid composed of rows and columns that describe the unique address of each cell. In the second step, the cells are grouped and transformed to concentric circles while maintaining their address and connection to the rows and columns as defined in the first step. A goal of this transformation is not only to put the cells on rings but also to keep the distance between cells and the distance between rings constant over the entire aperture. In order to accomplish this goal, there are several ways to group the cells.

Figure 33:
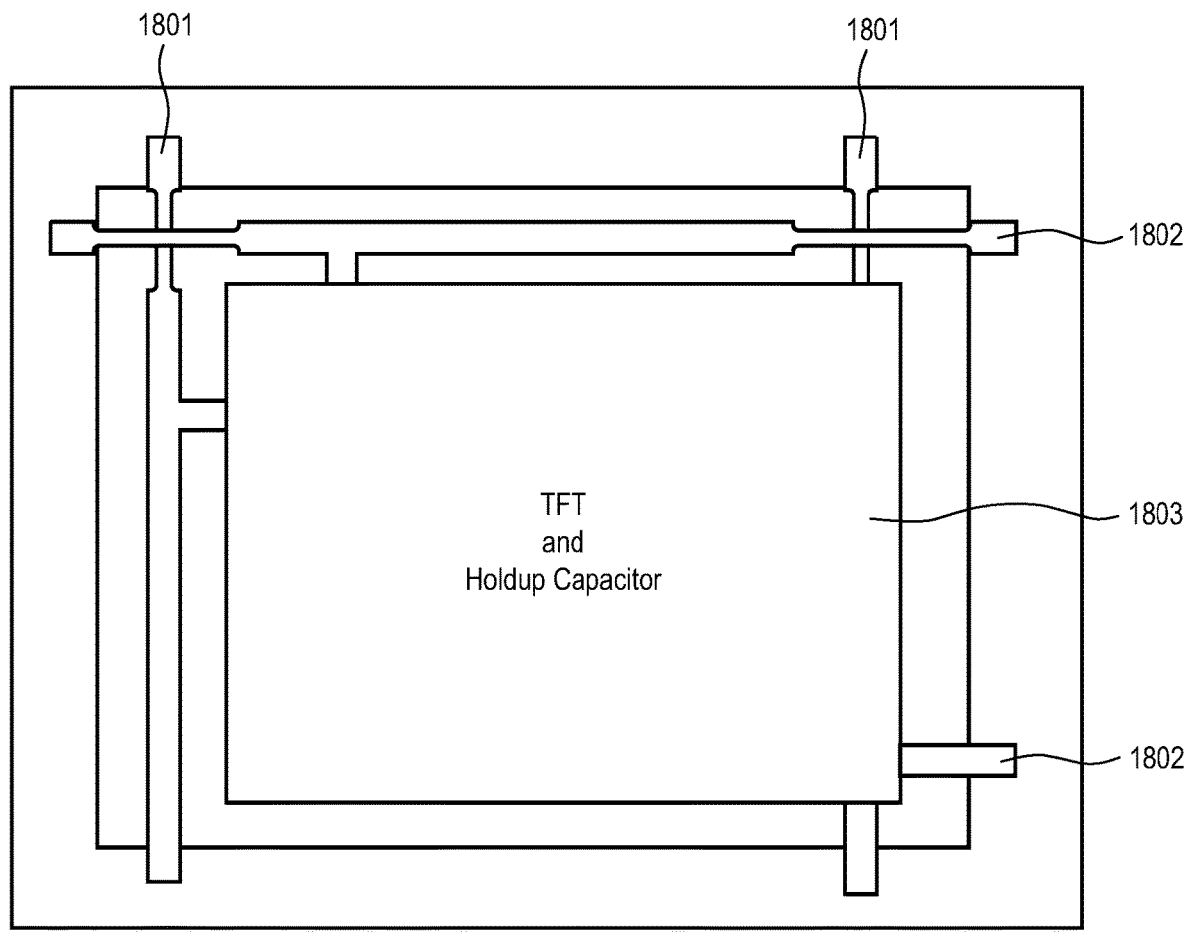
FIG. 33 illustrates one embodiment of a TFT package.

In one embodiment, a TFT package is used to enable placement and unique addressing in the matrix drive. FIG. 33 illustrates one embodiment of a TFT package. Referring to FIG. 33, a TFT and a hold capacitor 1803 is shown with input and output ports. There are two input ports connected to traces 1801 and two output ports connected to traces 1802 to connect the TFTs together using the rows and columns. In one embodiment, the row and column traces cross in 90° angles to reduce, and potentially minimize, the coupling between the row and column traces. In one embodiment, the row and column traces are on different layers.

An Example of a Full Duplex Communication System

Figure 34:
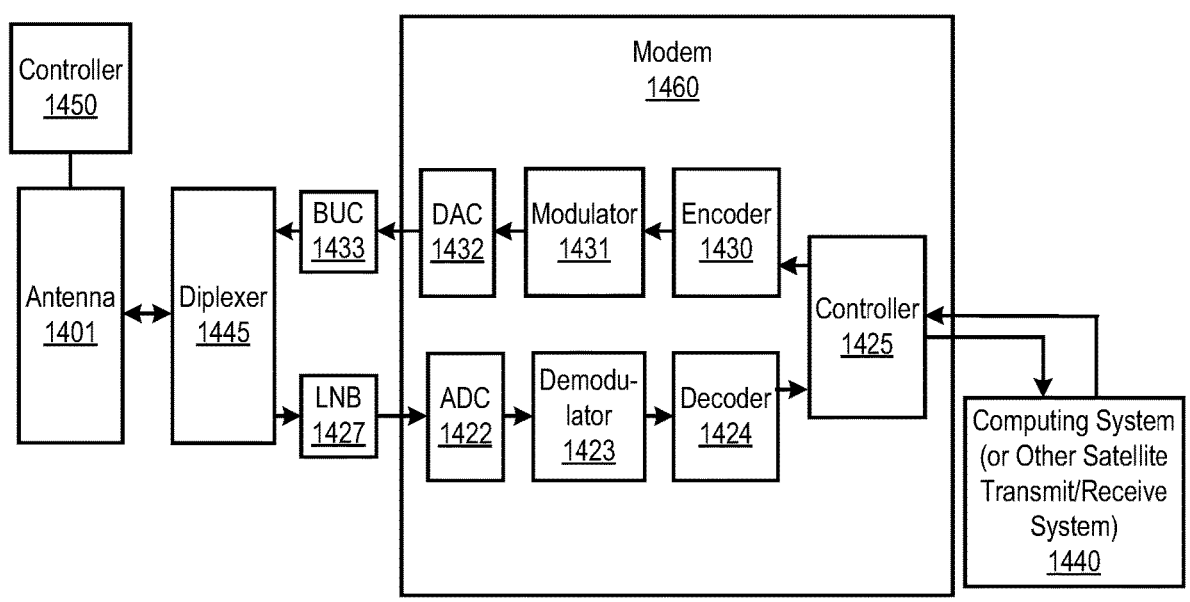
FIG. 34 is a block diagram of one embodiment of a communication system having simultaneous transmit and receive paths.

In another embodiment, the combined antenna apertures are used in a full duplex communication system. FIG. 34 is a block diagram of another embodiment of a communication system having simultaneous transmit and receive paths. While only one transmit path and one receive path are shown, the communication system may include more than one transmit path and/or more than one receive path.

Referring to FIG. 34, antenna 1401 includes two spatially interleaved antenna arrays operable independently to transmit and receive simultaneously at different frequencies as described above. In one embodiment, antenna 1401 is coupled to diplexer 1445. The coupling may be by one or more feeding networks. In one embodiment, in the case of a radial feed antenna, diplexer 1445 combines the two signals and the connection between antenna 1401 and diplexer 1445 is a single broad-band feeding network that can carry both frequencies.

Diplexer 1445 is coupled to a low noise block down converter (LNBs) 1427, which performs a noise filtering function and a down conversion and amplification function in a manner well-known in the art. In one embodiment, LNB 1427 is in an out-door unit (ODU). In another embodiment, LNB 1427 is integrated into the antenna apparatus. LNB 1427 is coupled to a modem 1460, which is coupled to computing system 1440 (e.g., a computer system, modem, etc.).

Modem 1460 includes an analog-to-digital converter (ADC) 1422, which is coupled to LNB 1427, to convert the received signal output from diplexer 1445 into digital format. Once converted to digital format, the signal is demodulated by demodulator 1423 and decoded by decoder 1424 to obtain the encoded data on the received wave. The decoded data is then sent to controller 1425, which sends it to computing system 1440.

Modem 1460 also includes an encoder 1430 that encodes data to be transmitted from computing system 1440. The encoded data is modulated by modulator 1431 and then converted to analog by digital-to-analog converter (DAC) 1432. The analog signal is then filtered by a BUC (upconvert and high pass amplifier) 1433 and provided to one port of diplexer 1445. In one embodiment, BUC 1433 is in an out-door unit (ODU).

Diplexer 1445 operating in a manner well-known in the art provides the transmit signal to antenna 1401 for transmission.

Controller 1450 controls antenna 1401, including the two arrays of antenna elements on the single combined physical aperture.

The communication system would be modified to include the combiner/arbiter described above. In such a case, the combiner/arbiter after the modem but before the BUC and LNB.

Note that the full duplex communication system shown in FIG. 34 has a number of applications, including but not limited to, internet communication, vehicle communication (including software updating), etc.

There are a number of example embodiments described herein.

Example 1 is a method for use by a terminal in a satellite communication system, where the terminal has an antenna, a modem and a controller, and the method comprises: determining the scan and skew of the antenna; obtaining, using the controller, a value representing a maximum allowed Power Spectral Density (PSD) for the determined scan and skew; determining, using the controller, a maximum allowable modem power based on the value representing a maximum allowed PSD, the maximum allowable modem power being that which ensures that transmissions from the terminal do not exceed the maximum allowed PSD if the maximum allowable modem output power is not exceeded by the modem; sending, using the controller, an indication of the allowable modem output power to the modem; and performing one or more transmissions from the terminal based on modem outputs in accordance with the maximum allowable modem output power.

Example 2 is the method of example 1 that may optionally include that the controller is part of an antenna subsystem module (ASM).

Example 3 is the method of example 2 that may optionally include that the maximum allowable modem power is determined without communication with a hub in the satellite communication system.

Example 4 is the method of example 1 that may optionally include that the maximum PSD value is that which meets a regulatory limit.

Example 5 is the method of example 1 that may optionally include that determining the maximum allowable modem power comprises: determining an Equivalent Isotropic Radiated Power (EIRP); obtaining an antenna gain; determining a maximum block upconverter (BUC) output power based on the EIRP and the antenna gain; and determining the maximum modem output power based on the maximum BUC power.

Example 6 is the method of example 5 that may optionally include that obtaining the antenna gain comprises calculating the antenna gain based on elevation angle.

Example 7 is the method of example 5 that may optionally include that determining the maximum BUC power based on the EIRP and the antenna gain comprises subtracting the antenna gain from the EIRP.

Example 8 is the method of example 5 that may optionally include that determining the maximum modem output power is based on a power transfer curve of the BUC power to modem power relationship.

Example 9 is the method of example 1 that may optionally include that sending the indication comprises sending a single message from an ASM of the terminal to the modem.

Example 10 is a terminal for use in a satellite communication system, the terminal comprising: an aperture having radiating antenna elements operable to radiate radio frequency (RF) signals; a modem coupled to the aperture; a BUC coupled to the modem; and a controller coupled to the modem and the BUC and operable to obtain a value representing a maximum allowed PSD for the scan and skew of the aperture, determine a maximum allowable modem power based on the value representing a maximum allowed PSD, the maximum allowable modem power being that which ensures that transmissions from the terminal do not exceed the maximum allowed PSD if the maximum allowable modem output power is not exceeded by the modem, and send an indication of the allowable modem output power to the modem, wherein the aperture transmits wirelessly based on modem outputs in accordance with the maximum allowable modem output power.

Example 11 is the terminal of example 10 that may optionally include that the controller is part of an antenna subsystem module (ASM) that includes the aperture.

Example 12 is the terminal of example 10 that may optionally include that the maximum allowable modem power is determined without communication with a hub in a satellite communication system in which the aperture transmits satellite communications.

Example 13 is the terminal of example 10 that may optionally include that the maximum PSD value is that which meets a regulatory limit.

Example 14 is the terminal of example 10 that may optionally include that the controller determines the maximum allowable modem power by: determining an Equivalent Isotropic Radiated Power (EIRP); obtaining an antenna gain; determining a maximum BUC power based on the EIRP and the antenna gain; and determining the maximum modem output power based on the maximum BUC power.

Example 15 is the terminal of example 14 that may optionally include that the controller obtains the antenna gain by calculating the antenna gain based on elevation angle.

Example 16 is the terminal of example 14 that may optionally include that the controller determines the maximum BUC power based on the EIRP and the antenna gain by subtracting the antenna gain from the EIRP.

Example 17 is the terminal of example 14 that may optionally include that the controller determines the maximum modem output power based on the maximum BUC power using a power transfer curve of the BUC power to modem power relationship.

Example 18 is an article of manufacture having one or more non-transitory computer readable media storing instruction thereon which, when executed by a terminal having an antenna, a modem and a controller, cause the terminal to perform a method comprising: determining the scan and skew of the antenna; obtaining, using the controller, a value representing a maximum allowed PSD for the determined scan and skew; determining, using the controller, a maximum allowable modem power based on the value representing a maximum allowed PSD, the maximum allowable modem power being that which ensures that transmissions from the terminal do not exceed the maximum allowed PSD if the maximum allowable modem output power is not exceeded by the modem; sending, using the controller, an indication of the allowable modem output power to the modem; and performing one or more transmissions from the terminal based on modem outputs in accordance with the maximum allowable modem output power.

Example 19 is the article of manufacture of example 18 that may optionally include that determining the maximum allowable modem power comprises: determining an Equivalent Isotropic Radiated Power (EIRP); obtaining an antenna gain; determining a maximum BUC power based on the EIRP and the antenna gain; and determining the maximum modem output power based on the maximum BUC power.

Example 20 is the article of manufacture of example 18 that may optionally include that obtaining the antenna gain comprises calculating the antenna gain based on elevation angle, determining the maximum BUC power based on the EIRP and the antenna gain comprises subtracting the antenna gain from the EIRP, and determining the maximum modem output power is based on a power transfer curve of the BUC power to modem power relationship.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for use by a terminal in a satellite communication system, the terminal having an antenna, a modem and a controller, the method comprising:
    determining the scan and skew of the antenna;
    obtaining, using the controller, a value representing a maximum allowed Power Spectral Density (PSD) for the determined scan and skew;
    determining, using the controller, a maximum allowable modem output power based on the value representing a maximum allowed PSD, the maximum allowable modem output power being that which ensures that transmissions from the terminal do not exceed the maximum allowed PSD if the maximum allowable modem output power is not exceeded by the modem;
    sending, using the controller, an indication of the maximum allowable modem output power to the modem to control the modem to limit modem output power to no more than the maximum allowable modem output power to ensure that transmissions from the terminal do not exceed the maximum allowed PSD; and
    performing one or more transmissions from the terminal based on the modem output power in accordance with the maximum allowable modem output power.

2. The method defined in claim 1 wherein determining the maximum allowable modem output power is based on a power transfer curve related to modem output power.

3. The method defined in claim 1 wherein the controller is part of an antenna subsystem module (ASM).

4. The method defined in claim 1 wherein the maximum allowable modem output power is determined without communication with a hub in the satellite communication system.

5. The method defined in claim 1 wherein the maximum PSD value is that which meets a regulatory limit.

6. The method defined in claim 1 wherein determining the maximum allowable modem output power comprises:
    determining an Equivalent Isotropic Radiated Power (EIRP);
    obtaining an antenna gain;
    determining a first maximum output power based on the EIRP and the antenna gain; and
    determining the maximum allowable modem output power based on the first maximum output power.

7. The method defined in claim 6 wherein obtaining the antenna gain comprises calculating the antenna gain based on elevation angle.

8. The method defined in claim 6 wherein determining the first maximum output power based on the EIRP and the antenna gain comprises subtracting the antenna gain from the EIRP.

9. The method defined in claim 1 wherein sending the indication comprises sending a single message from an ASM of the terminal to the modem.

10. A terminal for use in a satellite communication system, the terminal comprising:
    an aperture having radiating antenna elements operable to radiate radio frequency (RF) signals;
    a modem coupled to the aperture; and
    a controller coupled to the modem and operable to
    obtain a value representing a maximum allowed Power Spectral Density (PSD) for the scan and skew of the aperture,
    determine a maximum allowable modem output power based on the value representing a maximum allowed PSD, the maximum allowable modem output power being that which ensures that transmissions from the terminal do not exceed the maximum allowed PSD if the maximum allowable modem output power is not exceeded by the modem, and
    send an indication of the maximum allowable modem output power to the modem to limit modem output power to no more than the maximum allowable modem output power to ensure that transmissions from the terminal do not exceed the maximum allowed PSD, wherein the aperture transmits wirelessly based on modem output power in accordance with the maximum allowable modem output power.

11. The terminal defined in claim 10 wherein the controller determines the maximum allowable modem output power based on the first maximum output power using a power transfer curve related to modem output power.

12. The terminal defined in claim 10 wherein the controller is part of an antenna subsystem module (ASM) that includes the aperture.

13. The terminal defined in claim 10 wherein the maximum allowable modem output power is determined without communication with a hub in a satellite communication system in which the aperture transmits satellite communications.

14. The terminal defined in claim 10 wherein the maximum PSD value is that which meets a regulatory limit.

15. The terminal defined in claim 10 wherein the controller determines the maximum allowable modem output power by:
    determining an Equivalent Isotropic Radiated Power (EIRP);
    obtaining an antenna gain;
    determining a first maximum power based on the EIRP and the antenna gain; and
    determining the maximum allowable modem output power based on the first maximum output power.

16. The terminal defined in claim 15 wherein the controller obtains the antenna gain by calculating the antenna gain based on elevation angle.

17. The terminal defined in claim 15 wherein the controller determines the first maximum power based on the EIRP and the antenna gain by subtracting the antenna gain from the EIRP.

18. One or more non-transitory computer readable media storing instructions thereon which, when executed by a terminal having an antenna, a modem and a controller, cause the terminal to perform a method comprising:
    determining the scan and skew of the antenna;
    obtaining, using the controller, a value representing a maximum allowed Power Spectral Density (PSD) for the determined scan and skew;

determining, using the controller, a maximum allowable modem output power based on the value representing a maximum allowed PSD, the maximum allowable modem output power being that which ensures that transmissions from the terminal do not exceed the maximum allowed PSD if the maximum allowable modem output power is not exceeded by the modem;

sending, using the controller, an indication of the maximum allowable modem output power to the modem to limit modem output power to no more than the maximum allowable modem output power to ensure that transmissions from the terminal do not exceed the maximum allowed PSD; and performing one or more transmissions from the terminal based on modem output power in accordance with the maximum allowable modem output power.

19. The one or more non-transitory computer readable media defined in claim 18 wherein determining the maximum allowable modem power comprises:

determining an Equivalent Isotropic Radiated Power (EIRP);

obtaining an antenna gain;

determining a first maximum output power based on the EIRP and the antenna gain; and determining the maximum allowable modem output power based on the first maximum output power.

20. The one or more non-transitory computer readable media defined in claim 19 wherein obtaining the antenna gain comprises calculating the antenna gain based on elevation angle, determining the first maximum output power based on the EIRP and the antenna gain comprises subtracting the antenna gain from the EIRP, and determining the maximum modem output power is based on a power transfer curve related to modem output power.

* * * * *